(12) United States Patent
Yamada et al.

(10) Patent No.: US 8,515,356 B2
(45) Date of Patent: Aug. 20, 2013

(54) RADIO COMMUNICATION SYSTEM, LEAST SIGNIFICANT STATION, AND MOST SIGNIFICANT STATION

(75) Inventors: Takefumi Yamada, Kawasaki (JP); Takahiro Asai, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1045 days.

(21) Appl. No.: 12/521,185

(22) PCT Filed: Feb. 4, 2008

(86) PCT No.: PCT/JP2008/051764
§ 371 (c)(1),
(2), (4) Date: Jun. 25, 2009

(87) PCT Pub. No.: WO2008/096707
PCT Pub. Date: Aug. 14, 2008

(65) Prior Publication Data
US 2010/0087150 A1    Apr. 8, 2010

(30) Foreign Application Priority Data
Feb. 8, 2007   (JP) .................................. 2007-029434

(51) Int. Cl.
*H04B 17/00*   (2006.01)
(52) U.S. Cl.
USPC .................. 455/67.11; 455/67.13; 455/67.15; 455/453; 455/519; 455/518; 455/448; 455/449; 455/450
(58) Field of Classification Search
None
See application file for complete search history.

(56) References Cited

U.S. PATENT DOCUMENTS 6,320,871 B1 * 11/2001 Mizuguchi et al. ........... 370/452
7,379,742 B2 * 5/2008 Li et al. ...................... 455/452.1
(Continued)

FOREIGN PATENT DOCUMENTS

| JP | 3 250821 | 11/1991 |
| JP | 9 182141 | 7/1997 |

(Continued)

OTHER PUBLICATIONS

Office Action issued Jan. 20, 2011 in Korea Application No. 10-2009-7018416 (With English Translation).

(Continued)

*Primary Examiner* — Fayyaz Alam
*Assistant Examiner* — Mohammed Rachedine
(74) *Attorney, Agent, or Firm* — Oblon, Spivak, McClelland, Maier & Neustadt, L.L.P.

(57) ABSTRACT

In a radio communication system (1), a lower-level station (10*a*) has: a lower-level station ID detection unit (13) which detects a lower-level station ID for identifying another lower-level station (10*b*), from a signal from the other lower-level station (10*b*); a group ID detection unit (12) which identifies a group ID for identifying a group to which the other lower-level station (10*b*) belongs; a measurement unit (15) which measures a channel utilization state of the other lower-level station (10*b*); a utilization probability update unit (19) which calculates a channel utilization amount for each lower-level station and a channel utilization amount for each group based on the lower-level station ID, group ID and channel utilization state, and updates a channel utilization probability which indicates the utilization probability of communication channels based on the channel utilization amount for each lower-level station and the channel utilization amount for each group; and a channel determination unit (20) which determines a communication channel to be utilized for transmission by the lower-level station, based on this channel utilization probability.

8 Claims, 14 Drawing Sheets

(56) References Cited

U.S. PATENT DOCUMENTS

| | | | |
|---|---|---|---|
| 2002/0034962 A1* | 3/2002 | Yokoyama | 455/519 |
| 2002/0147017 A1 | 10/2002 | Li et al. | |
| 2003/0058833 A1* | 3/2003 | Hashem et al. | 370/350 |
| 2004/0202131 A1 | 10/2004 | An et al. | |
| 2006/0002421 A1* | 1/2006 | Kuwahara et al. | 370/464 |
| 2011/0222495 A1* | 9/2011 | Li et al. | 370/329 |

FOREIGN PATENT DOCUMENTS

| | | |
|---|---|---|
| JP | 2001 128244 | 5/2001 |
| JP | 2002 186019 | 6/2002 |
| JP | 2005 102225 | 4/2005 |
| JP | 2006 303779 | 11/2006 |
| KR | 10-2004-0089312 | 10/2004 |
| KR | 10-2005-0023322 | 3/2005 |
| WO | WO 2004/001545 A2 | 12/2003 |
| WO | WO 2007053141 A1 * | 5/2007 |

OTHER PUBLICATIONS

Office Action issued Sep. 21, 2011, in Taiwanese Patent Application No. 097104662 (with English-language translation).

Xing, Y. et al., "Dynamic Spectrum Access in Open Spectrum Wirelss Networks", IEEE Journal on Selected Areas in Communications, (JSAC), vol. 24, No. 3, pp. 626-637, (2006).

"Game theory evolving: A probrem-centered introduction to modeling strategic behavior", H. Gintis, Prinston Univ. press, p. 258-261, (2000).

Office Action issued Oct. 18, 2012, and Taiwan IPO Search Report issued Sep. 1, 2012, in Taiwan Patent Application No. 097104662, filed Feb. 5, 2008 (with English-language Translation).

* cited by examiner

RADIO COMMUNICATION SYSTEM, LEAST SIGNIFICANT STATION, AND MOST SIGNIFICANT STATION

TECHNICAL FIELD

The present invention relates to a radio communication system, lower-level station and upper-level station.

BACKGROUND ART

Recently as radio communication technology advances and demands for radio communication expand, means of effectively utilizing frequency resources and flexibly allocating frequencies are demanded. Possible means of implementing flexible frequency allocation is providing an environment where a frequency band utilized for communication is shared by a plurality of mobile stations. In a communication environment where communication channels are shared, the interests of each mobile stations conflict, so an appropriate channel utilization probability control method is required so that the communication channels are allocated fairly. As a result, methods for controlling frequency allocation considering the impartiality in unit of mobile station has been developed. These methods are utilized for wireless LAN systems which are operated in radio frequency bands for industry, science and medicine, for example. In the following Non-patent Document 1, a method for controlling the utilization probability of communication channels, so that the gain of each mobile station is allocated fairly, is stated, targeting such an environment where a plurality of mobile stations share communication channels.

Non-patent Document 1: Y. Xing, R. Chandramouli, S. Mangold, S. Shankar: "Dynamic Spectrum Access in Open Spectrum Wireless Networks", IEEE Journal on Selected Areas in Communications (JSAC), Vol. 24, No. 3, pp. 626-637, March 2006

Non-patent Document 2: H. Gintis: "Game Theory Evolving: A Problem-centered Introduction to Modeling Strategic Behavior", Prinston University Press, 2000

DISCLOSURE OF THE INVENTION

Problem to be Solved by the Invention

However, the above mentioned prior art could not sufficiently support a case when a plurality of radio communication providers exist and a plurality of mobile stations belong to each of these providers. For example, if a channel utilization probability is controlled so that the gain in each mobile station is allocated fairly, the gain in each provider becomes a value which is in proportion to a number of mobile stations belonging to the provider, therefore an unfair state occurs if the number of mobile stations is not balanced.

This situation also occurs in relationships other than a relationship between a base station and mobile stations. For example, in a relationship between a lower-level base station which directly communicates with mobile stations and an upper-level base station which accommodates a plurality of such lower-level base stations, or in a relationship between an MVNO provider, which rents a communication facility from an MNO provider having the communication facility and the MNO provider which accommodates a plurality of such MVNO providers, a similar unfair state may occur.

If this unfairness is allowed, each provider will be interested only in acquiring users, since the communication channels that each provider can utilize is determined by a number of acquired users. As a result, enthusiasm for technological development and equipment investment, for effectively utilizing frequencies which are limited resources, would decline, and it would be difficult to construct a frequency sharing environment which allows sustainable development over the long term. Another possible problem that could occur is that a provider having a low gain could instruct its subordinate mobile stations to increase channel utilization probability without careful consideration, so as to expand the gain. This kind of selfish increase of channel utilization probability, without considering the gain of others, however, induces an increase of collision between transmission signals from a mobile station and transmission signals from other mobile stations. As a result, the gain of the mobile station does not increase as expected, and also the gains of the other mobile stations decrease, and the utilization efficiency of all communication channels could drop considerably. In some cases no single user would be able to communicate.

With the foregoing in view, it is an object of the present invention to provide a radio communication system, lower-level station and upper-level station which can improve communication channel utilization efficiency.

Means for Solving the Problem

A radio communication system of the present invention comprises an upper-level station and a plurality of lower-level stations, in which each of the lower-level stations has a lower-level station ID for identifying the lower-level station and a group ID for identifying a group to which the lower-level station belongs, and a signal including the lower-level station ID and the group ID can be transmitted/received between the lower-level stations, wherein the lower-level station comprises: detection unit for detecting, from a signal from another lower-level station, the lower-level station ID and the group ID of the other lower-level station; measurement unit for measuring a channel utilization state of the other lower-level station based on the signal; calculation unit for calculating a channel utilization amount for each lower-level station and a channel utilization amount for each group, based on the lower-level station ID and group ID of the other lower-level station detected by the detection unit and the channel utilization state of the other lower-level station measured by the measurement unit; update unit for updating channel utilization probability which indicates the utilization probability of communication channels based on the channel utilization amount for each lower-level station and the channel utilization amount for each group calculated by the calculation unit; and determination unit for determining a communication channel to be utilized for transmission by the lower-level station, based on the channel utilization probability updated by the update unit.

A lower-level station of the present invention is a lower-level station which has a lower-level station ID for identifying the lower-level station and a group ID for identifying a group to which the lower-level station belongs, and can transmit/receive a signal including the lower-level station ID and the group ID between the lower-level station and another lower-level station, comprises: detection unit for detecting, from a signal from the other lower-level station, the lower-level station ID and the group ID of the other lower-level station; measurement unit for measuring a channel utilization state of the other lower-level station based on the signal; calculation unit for calculating a channel utilization amount for each lower-level station and a channel utilization amount for each group, based on the lower-level station ID and group ID of the other lower-level station detected by the detection unit and the channel utilization state of the other lower-level station measured by the measurement unit; update unit for updating channel utilization probability which indicates the utilization probability of communication channels based on the channel utilization amount for each lower-level station and the channel utilization amount for each group calculated by the calculation unit; and determination unit for determining a communication channel to be utilized for transmission by the lower-level station, based on the channel utilization probability updated by the update unit.

According to the above mentioned radio communication system and the lower-level station, the lower-level station ID and group ID of the other lower-level station are detected from the received signal, and the channel utilization state of the other lower-level station is measured based on this signal. And a channel utilization amount for each lower-level station and a channel utilization amount for each group are calculated based on these information. And based on the channel utilization amount for each lower-level station and the channel utilization amount for each group, the channel utilization probability is updated, and based on the updated channel utilization probability, a communication channel to be utilized for transmission of the lower-level station is determined. Thereby a communication channel to be utilized can be determined, considering not only the channel utilization amount for each lower-level station, but also the channel utilization amount for each group. In other words, the communication channels can be impartially allocated both among the lower-level stations and among groups. As a result, an unnecessary collision of signals can be decreased, and the utilization efficiency of the communication channels can be further improved. Also a stable communication environment can be provided to users of the radio communication system.

In the radio communication system of the present invention, it is preferable that the calculation unit is configured to calculate the channel utilization amount for each lower-level station and the channel utilization amount for each group based on a reaction coefficient which indicates a partiality in the allocation of communication channels within the group as well as the lower-level station ID, the group ID and the channel utilization state.

In this case, an unfairness in allocation of the communication channels is considered when the channel utilization amount is calculated. Thereby the channel utilization probability of the lower-level station to which a transmission signal is about to be transmitted can be adjusted with priority, and therefore unfairness in allocation is corrected. As a result, the utilization efficiency of the communication channels can be improved.

In the radio communication system of the present invention, it is preferable that the calculation unit is configured to calculate the channel utilization amount for each lower-level station and the channel utilization amount for each group based on a weight coefficient on which priority of the group is reflected as well as the lower-level station ID, the group ID and the channel utilization state.

In this case, priority of the group is considered when the channel utilization amount is calculated. Since the channel utilization probability is updated so that the priority of the group is reflected, the utilization probability of communication channels can be further improved.

In the radio communication system of the present invention, it is preferable that the measurement unit is configured to measure the channel utilization state of the other lower-level station based on a communication channel utilization time for each lower-level station.

In this case, the channel utilization state of the other lower-level station is measured based on the communication channel utilization time for each lower-level station. In the radio communication system, the communication channel utilization time, that is, the transmission time increases/decreases depending on the volume of data to be transmitted, so measuring the channel utilization state based on the communication channel utilization time is effective to determine an appropriate communication channel. This also can further increase a utilization efficiency of the communication channel.

In the radio communication system of the present invention, it is preferable that the measurement unit is configured to measure the channel utilization state of the other lower-level station based on a bandwidth utilized by each lower-level station as well as the communication channel utilization time for each lower-level station.

In this case, the channel utilization state of the other lower-level station can be measured considering a bandwidth utilized by each lower-level station as well as the communication channel utilization time for each lower-level station. In the radio communication system, a different band may be utilized depending on the intended use (e.g. voice call, data transfer), so measuring the channel utilization state based on the bandwidth is effective to determine an appropriate communication channel. This can also further increase a utilization efficiency of the communication channel.

In the radio communication system, it is preferable that the measurement unit is configured to measure the channel utilization state of the other lower-level station based on a reaching range of a signal which each lower-level station transmits as well as the communication channel utilization time for each lower-level station and the bandwidth utilized by each lower-level station.

In this case, the channel utilization state of the other lower-level station is measured considering the reaching range of the transmission signal which is transmitted by each lower-level station as well as the communication channel utilization time for each lower-level station and the bandwidth utilized by each lower-level station. Since the reaching range of the transmission signal changes depending on the radio communication method utilized for the radio communication system and influence of the station disposition design, measuring the channel utilization state based on the reaching range of the signal is effective to determine an appropriate channel. This also further increases a utilization efficiency of the communication channel.

A radio communication system of the present invention is a radio communication system comprising an upper-level station and a plurality of lower-level stations, in which each of the lower-level station has a lower-level station ID for identifying the lower-level station and a group ID for identifying a group to which the lower-level station belongs, and a signal including the lower-level station ID and the group ID can be transmitted/received between the lower-level stations, wherein the lower-level station comprises: request transmission unit for transmitting, to the upper-level station, a channel request to have the upper-level station determine a communication channel to be utilized for transmission by the lower-level station; and channel information receiving unit for receiving channel information which indicates a communication channel determined by the upper-level station in response to the channel request transmitted by the request transmission unit, and the upper-level station comprises: detection unit for detecting the lower-level station ID and the group ID from the signal from the lower-level station connected with the upper-level station; measurement unit for measuring a channel utilization state of the lower-level station connected with the upper-level station, based on the signal; calculation unit for calculating a channel utilization amount for each lower-level station and a channel utilization amount for each group, based on the lower-level station ID and group ID detected by the detection unit and the channel utilization state measured by the measurement unit; update unit for updating channel utilization probability which indicates the utilization probability of communication channels based on the channel utilization amount for each lower-level station and the channel utilization amount for each group calculated by the calculation unit; determination unit for determining a communication channel to be utilized for transmission by the lower-level station which has transmitted the channel request, based on the channel utilization probability updated by the update unit; and channel information transmission unit for transmitting the channel information which indicates the communication channel determined by the determination unit, to the lower-level station which has transmitted the channel request.

An upper-level station of the present invention is an upper-level station which, upon receiving, from a lower-level station, a channel request to determine a communication channel to be utilized for transmission by the lower-level station which transmits a signal including a lower-level station ID for identifying the lower-level station and a group ID for identifying a group to which the lower-level station belongs, transmits channel information which indicates the communication channel to the lower-level station, comprising: detection unit for detecting the lower-level station ID and the group ID from the signal from the lower-level station connected with the upper-level station; measurement unit for measuring a channel utilization state of the lower-level station connected with the upper-level station based on the signal; calculation unit for calculating a channel utilization amount for each lower-level station and a channel utilization amount for each group, based on the lower-level station ID and group ID detected by the detection unit and the channel utilization state measured by the measurement unit; update unit for updating channel utilization probability which indicates the utilization probability of communication channels based on the channel utilization amount for each lower-level station and the channel utilization amount for each group calculated by the calculation unit; determination unit for determining a communication channel to be utilized for transmission by the lower-level station which has transmitted the channel request, based on the channel utilization probability updated by the update unit; and channel information transmission unit for transmitting the channel information which indicates the communication channel determined by the determination unit, to the lower-level station which has transmitted the channel request.

According to the above mentioned radio communication system and the upper-level station, when a lower-level station transmits the channel request to an upper-level station, the lower-level station ID and group ID are detected from the signal received from the lower-level station connected with the upper level station, and the channel utilization state is measured based on the signal. And the channel utilization amount for each lower-level station and the channel utilization amount for each group are calculated based on the lower-level station ID, group ID and channel utilization state. Then the channel utilization probability is updated based on the channel utilization amount for each lower-level station and the channel utilization amount for each group, and the communication channel to be utilized for transmission by the lower-level station is determined based on the channel utilization probability after the update. And the channel information which indicates the determined communication channel is transmitted to the lower-level station, and the lower-level station can utilize the determined communication channel for transmission. Thereby a communication channel to be utilized can be determined, considering not only the channel utilization amount for each lower-level station, but also the channel utilization amount for each group. In other words, the communication channel can be impartially allocated both among the lower-level stations and among groups. As a result, an unnecessary collision of the signals can be decreased, and utilization efficiency of the communication channels can be further improved. Also a stable communication environment can be provided to users of the radio communication system.

Also according to the above mentioned radio communication system and the upper-level station, the processing from the detection of the lower-level station ID and group ID to the determination of the communication channel is executed by the upper-level station. Therefore processing executed by the lower-level station of which processing capability is limited and of which ambient communication environment tends to deteriorate, is decreased, whereby a series of processing is executed by the upper-level station which excels in processing capability and has a good communication environment. As a result, the communication channel can be more accurately determined.

Effects of the Invention

According to the above mentioned radio communication system, lower-level station and upper-level station, the utilization efficiency of the communication channel can be further improved.

EXPLANATION OF REFERENCE SYMBOLS 1 is for radio communication system, 10 is for lower-level station, 10b is for another lower-level station, 12 and 35 are for group ID detection unit (detection unit), 13 and 36 are for lower-level station ID detection unit (detection unit), 15 and 38 are for measurement unit, 18 and 41 are for update amount calculation unit (calculation unit), 19 and 42 are for utilization probability update unit (update unit), 20 and 43 are for channel determination unit (determination unit), 24 is for request transmission unit, and 25 is for channel information receiving unit.

BEST MODE FOR CARRYING OUT THE INVENTION

Embodiments of the present invention will now be described in detail with reference to the accompanying drawings. In the description of the accompanying drawings, identical or similar elements are denoted with an identical symbol, where redundant description is omitted.

(First Embodiment)

Figure 1:
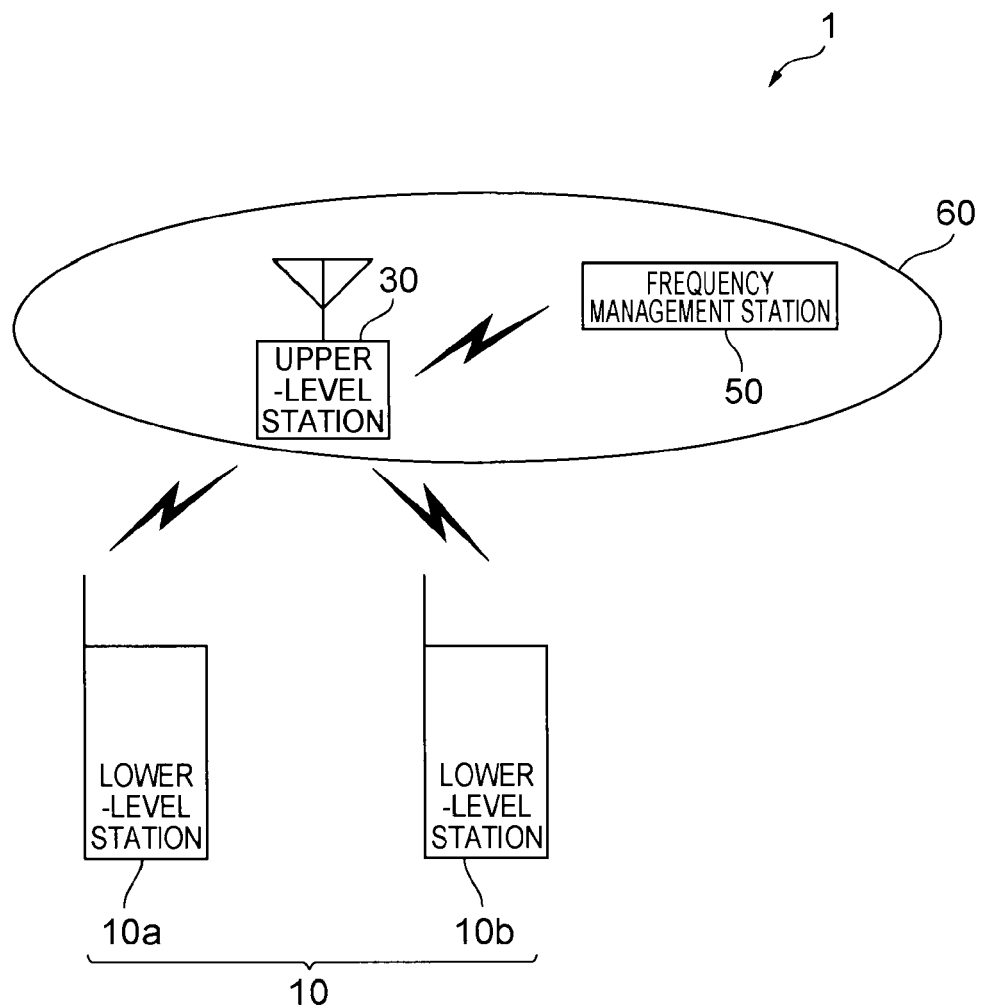
FIG. 1 is a diagram depicting a general configuration of a radio communication system according to a first embodiment.

A radio communication system 1 according to the first embodiment will be described first, with reference to FIG. 1. FIG. 1 is a diagram depicting a general configuration of the radio communication system 1.

The radio communication system 1 includes a plurality of lower-level stations 10, an upper-level station 30, and a mobile communication network 60 including a frequency management station 50. The lower-level stations 10 are, for example, cellular phones and personal digital assistants (PDA), but the lower-level stations 10 are not limited to these examples. The upper-level station 30 relays communication between the lower-level station 10 and another communication device (not illustrated) in the mobile communication network 60. The frequency management station 50 can transmit some information to the upper-level station 30.

In FIG. 1, only two lower-level stations 10, one upper-level station 30, one frequency management station 50, and one mobile communication network 60 are shown for simplification, but the number of lower-level stations 10, upper-level stations 30, frequency management stations 50 and mobile communication networks 60 constituting the radio communication system 1 are not limited. In the following description, a lower-level station which is about to transmit a transmission signal may be called lower-level station 10a, and other lower-level stations may be called lower-level stations 10b respectively, for convenience.

Figure 2:
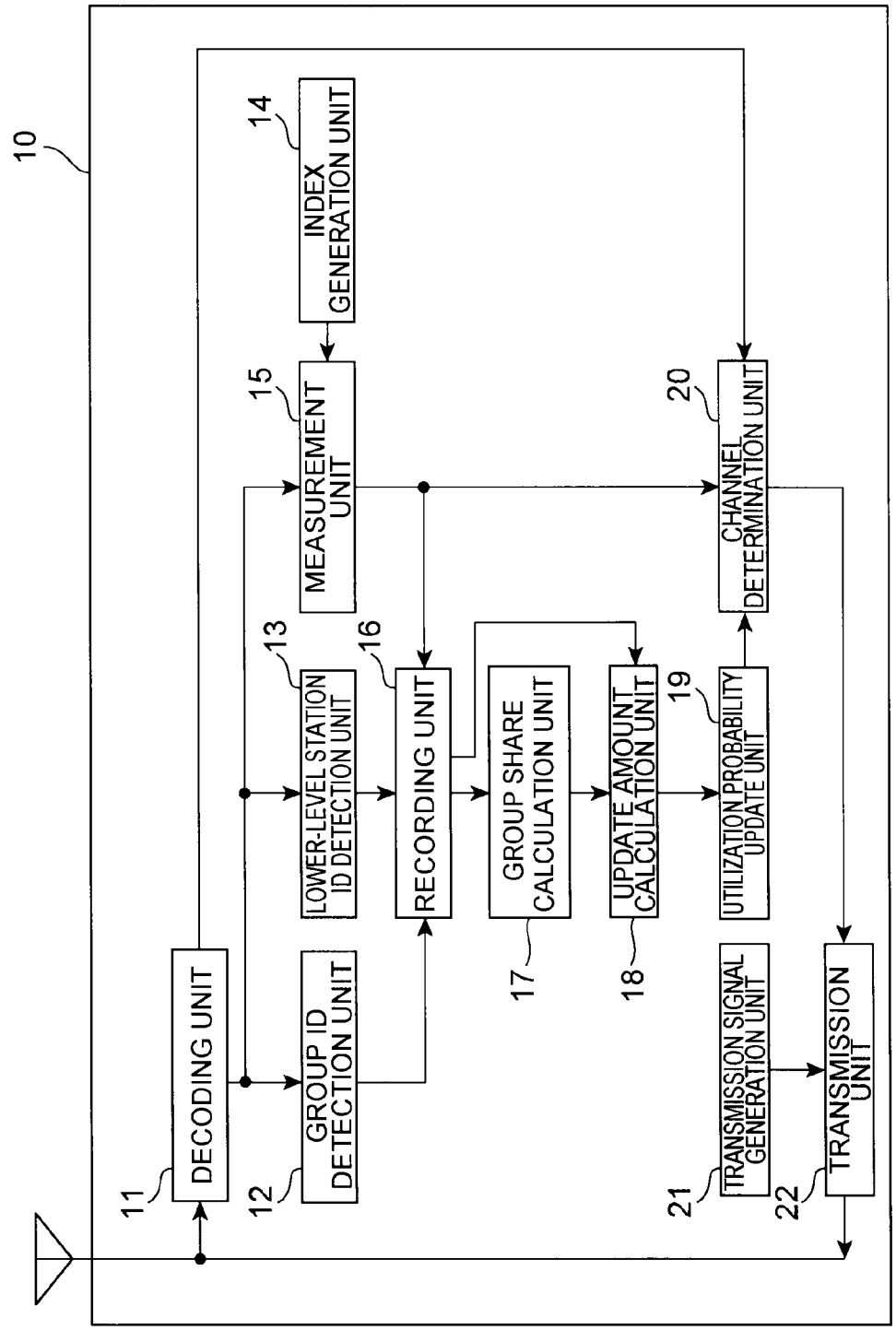
FIG. 2 is a diagram depicting a functional configuration of the lower-level station shown in FIG. 1.

Now the configuration of the lower-level station 10 shown in FIG. 1 will be described with reference to FIG. 2 and FIG. 3. FIG. 2 is a diagram depicting the lower-level station 10, and FIG. 3 is a block diagram depicting the hardware of the lower-level station 10.

The lower-level station 10 includes a decoding unit 11, a group ID detection unit (detection unit) 12, a lower-level station ID detection unit (detection unit) 13, an index generation unit 14, a measurement unit (measurement unit) 15, a recording unit 16, a group share calculation unit 17, an update amount calculation unit (calculation unit) 18, a utilization probability update unit (update unit) 19, a channel determination unit (determination unit) 20, a transmission signal generation unit 21 and a transmission unit 22, as the functional composing elements.

Figure 3:
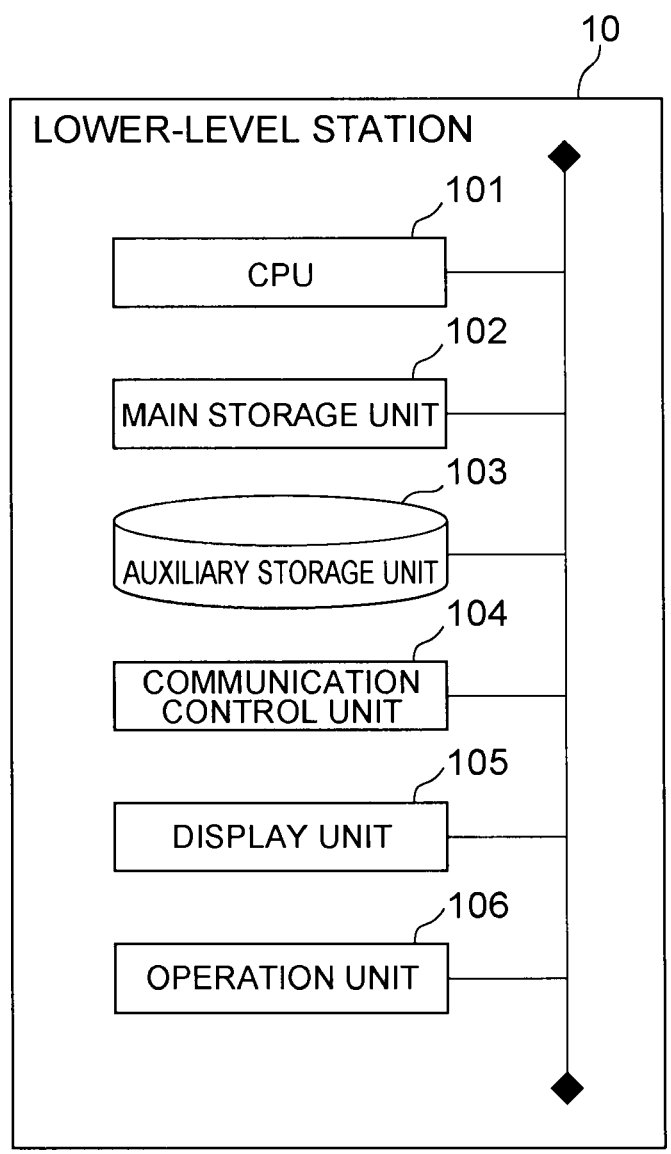
FIG. 3 is a block diagram depicting the hardware of the lower-level station shown in FIG. 1.

As FIG. 3 shows, this lower-level station 10 is comprised of, for example, a CPU 101 which executes an operating system and application programs, a main storage unit 102 such as ROM and RAM, an auxiliary storage unit 103 such as memory, a communication control unit 104 which performs data communication via the upper-level station 30, a display unit 105 such as a liquid crystal monitor, and an operation unit 106 such as a keyboard to input characters and numbers and instructions for execution. Each function described with reference to FIG. 2 is implemented by having the CPU 101 and the main storage unit 102 shown in FIG. 3 read predetermined software, having the communication control unit 104 operate under the control of the CPU 101, and also by having the main storage unit 102 and the auxiliary storage unit 103 read and write data.

The decoding unit 11 decodes the received radio waves, and outputs the decoded signal (received signal) to the group ID detection unit 12, lower-level station ID detection unit 13, measurement unit 15 and channel determination unit 20.

The group ID detection unit 12 detects a group ID for identifying a group to which a lower-level station 10b which has transmitted the signal belongs, from the received signal which was input from the decoding unit 11, and outputs this group ID to the recording unit 16. Examples of a group to which a lower-level station belongs are the providers who provide sources which the lower-level station requires for communication, such as a communication service provider and radio access network provider. If a lower-level station belongs to a plurality of groups, a plurality of group IDs corresponding to a number of these groups are assigned to a lower-level station.

The lower-level station ID detection unit 13 detects a lower-level station ID for identifying the other lower-level station 10b, which is a transmission source of this signal, from the received signal which was input from the decoding unit 11, and outputs this lower-level station ID to the recording unit 16.

The index generation unit 14 generates a measurement index, which is utilized for the measurement performed in the later mentioned measurement unit 15, and outputs the index to the measurement unit 15. This measurement index can be defined as, for example, the "time when a certain lower-level station and the other lower-level station which transmitted the received signal utilized the communication channel respectively".

The measurement unit 15 measures the channel utilization state of the other lower-level station 10b which transmitted the received signal and the group to which this lower-level station 10b belongs, based on the received signal which was input from the decoding unit 11 and the measurement index which was input from the index generation unit 14. And the measurement unit 15 outputs the measured channel utilization state of the other lower-level station 10b to the recording unit 16 and channel determination unit 20 as the utilization state information.

The recording unit 16 records the group ID which was input from the group ID detection unit 12, lower-level station ID which was input from the lower-level station ID detection unit 13, and utilization state information which was input from the channel utilization state measurement unit in a database (not illustrated). This database is periodically initialized using database update period information or is updated using the information, during the update period, indicated by the current update period information, from the past. The location to record the utilization state information is not limited to a database, but may be a memory, for example.

The recording unit 16 calculates a number of group IDs (group count) acquired during the database update period and number of lower-level station IDs (lower-level station count) acquired during this database update period based on the group ID and lower-level station ID recorded in the database.

The recording unit 16 also reads the utilization state information from the database. Then the recording unit 16 outputs the group count, lower-level station count and utilization state information to the group share calculation unit 17 and update amount calculation unit 18.

The group share calculation unit 17 calculates the group share information which indicates groups and number of lower-level stations belonging to the groups respectively, based on the group count and the lower-level station count which were input from the recording unit 16. The group share calculation unit 17 outputs this group share information to the update amount calculation unit 18.

The update amount calculation unit 18 calculates the update amount of the utilization probability, so that the total gain of each group indicated by the group ID becomes impartial, and the degree of satisfaction becomes impartial among the lower-level stations belonging to a same group. If a plurality of channels are available, the utilization probability may be defined for each channel, and the update amount may be calculated independently. The 'gain' is a channel utilization amount, the 'degree of satisfaction' is a numeric value represented using a utility function, and the 'impartial' is a state where the degree of satisfaction becomes the same value among the lower-level stations and among the groups.

The update amount calculation unit 18 calculates and compares the current degree of satisfaction in each group and each lower-level station, based on the group count, lower-level station count and utilization state information which were input from the recording unit 16, and the group share information which was input from the group share calculation unit. If it is inferred that a difference occurs (a partiality occurs) in the degree of satisfaction among each group and each lower-level station, the update amount calculation unit 18 calculates the current update amount of channel utilization probability (utilization probability update amount) of the communication channel, and outputs it to the utilization probability update unit 19 in order to improve partiality.

A concrete example of the processing of the update amount calculation unit 18 will now be described. As an example, it is assumed that each lower-level station has one group ID. And group 1 and 2 are assumed as the groups. In other words, the group count is 2. On the other hand, the lower-level station count is n. The utility function of each lower-level station belonging to group 1 and 2 in the present invention is given by the following equations, where $w_1$ is the weight coefficient belonging to group 1, $w_2$ is the weight coefficient belonging to group 2, $x_{1,i}$ is a channel utilization amount in the i-th lower-level station belonging to group 1, and $x_{2,i}$ is a channel utilization amount in the i-th lower-level station belonging to group 2.

[Equation 1]

$$U_{u1}(x_{1,i}) = w_1 x_{1,i} - \frac{1}{n-1} \left[ \begin{pmatrix} \alpha_i \sum_{x_{1,j} > x_{1,i}} (w_1 x_{1,j} - w_1 x_{1,i}) + \\ \beta_i \sum_{x_{1,i} > x_{1,j}} (w_1 x_{1,i} - w_1 x_{1,j}) \end{pmatrix} + \begin{pmatrix} \alpha_i \sum_{x_{2,j} > x_{1,i}} (w_2 x_{2,j} - w_1 x_{1,i}) + \\ \beta_i \sum_{x_{1,i} > x_{2,j}} (w_1 x_{1,i} - w_2 x_{2,j}) \end{pmatrix} \right] \quad (1)$$

[Equation 2]

$$U_{u2}(x_{2,i}) = w_2 x_{2,i} - \frac{1}{n-1} \left[ \begin{pmatrix} \alpha_i \sum_{x_{2,j} > x_{2,i}} (w_2 x_{2,j} - w_2 x_{2,i}) + \\ \beta_i \sum_{x_{2,i} > x_{2,j}} (w_2 x_{2,i} - w_2 x_{2,j}) \end{pmatrix} + \begin{pmatrix} \alpha_i \sum_{x_{1,j} > x_{2,i}} (w_1 x_{1,j} - w_2 x_{2,i}) + \\ \beta_i \sum_{x_{2,i} > x_{1,j}} (w_2 x_{2,i} - w_1 x_{1,j}) \end{pmatrix} \right] \quad (2)$$

Here, $\alpha_i$ is a reaction coefficient to a lower-level station of which gain is higher than the relevant lower-level station, and $\beta_i$ is a reaction coefficient to a lower-level station of which gain is lower than the relevant lower-level station. According to the above mentioned Non-patent Document 2, it is experientially known that a stable system can be constructed when $\alpha_i > \beta_i > 0$ is established.

In the same manner, the total gain of group 1 and group 2 are derived as follows, where group count $n_g = 2$.

[Equation 3]

$$U_{g1}(X_{g1}) = X_{g1} - \frac{1}{n_g - 1} \left[ \sum_{X_{g2} > X_{g1}} (X_{g2} - X_{g1}) + \sum_{X_{g1} > X_{g2}} (X_{g1} - X_{g2}) \right] = X_{g1} - \left[ \sum_{X_{g2} > X_{g1}} (X_{g2} - X_{g1}) + \sum_{X_{g1} > X_{g2}} (X_{g1} - X_{g2}) \right] \quad (3)$$

[Equation 4]

$$U_{g2}(X_{g2}) = X_{g2} - \frac{1}{n_g - 1} \left[ \sum_{X_{g1} > X_{g2}} (X_{g1} - X_{g2}) + \sum_{X_{g2} > X_{g1}} (X_{g2} - X_{g1}) \right] = X_{g2} - \left[ \sum_{X_{g1} > X_{g2}} (X_{g1} - X_{g2}) + \sum_{X_{g2} > X_{g1}} (X_{g2} - X_{g1}) \right] \quad (4)$$

In other words, the update amount calculation unit 18 calculates the channel utilization amount (gain) for each lower-level station and the channel utilization amount for each group.

$X_{g1}$ and $X_{g2}$ are the channel utilization amounts of all the lower-level stations belonging to each group respectively. $X_{g1}$ and $X_{g2}$ may be calculated using an update period that is different from the database update period, but in the first embodiment, $X_{g1}$ and $X_{g2}$ are calculated using the database update period. In this case, the following relationship is established.

[Equation 5]

$$X_{g1} = \sum_i x_{1,j}$$
$$X_{g2} = \sum_i x_{2,j} \quad (5)$$

In this environment, the following three conditions must be satisfied in order to satisfy impartiality both in the lower-level station unit and in the group unit at the same time:

1) the degree of satisfaction is impartial among the lower-level stations belonging to a same group;
2) the degree of satisfaction is impartial among the lower-level stations belonging to different groups; and
3) the degree of satisfaction compared in group units is impartial.

These three conditions are given by the following three equations.

[Equation 6]

$$U_{u1}(x_{1,l}) = U_{u1}(x_{1,m}) \quad (6)$$

[Equation 7]

$$U_{u1}(x_{1,l}) = U_{u2}(x_{2,m}) \quad (7)$$

[Equation 8]

$$U_{g1}(X_{g1}) = U_{g2}(X_{g2}) \quad (8)$$

This means that $w_1$ and $w_2$ to satisfy Equations (6) to (8) must be derived. In order to satisfy Equation (6), $X_{1,l} = X_{1,m}$ must be established. In order to satisfy Equation (7) at this time, the following equation must be established.

[Equation 9]

$$w_1 x_{1,l} = w_2 x_{2,m} \quad (9)$$

Equation (8) can be rewritten to the following equation, where $f_1$ and $f_2$ are the ratios (shares) of the lower-level stations belonging to group 1 and group 2 respectively.

[Equation 10]

$$n f_1 x_{1,l} = n f_2 x_{2,m} \quad (10)$$

Therefore, based on Equations (9) and (10), the weight coefficients $w_1$ and $w_2$ can be calculated by the following equation which represents a relative relationship of these weight coefficients.

[Equation 11]

$$w_2 = \frac{f_2}{f_1} w_1 \quad (11)$$

In this case, the weight coefficient information of another group is required to determine the weight coefficient of its group. However, the share information in its group can be measured in each lower-level station, so the weight coefficient information can be calculated without exchanging the weight coefficient information between groups or between lower-level stations, by making an agreement in advance, such as setting the weight coefficient information of a group of which share information is lowest as 1.

The above description is only the case when the group count is 2, but can be easily extended to the case when the group count is 3 or more.

Using weight coefficients $w_1$ and $w_2$ adjusted as above, the utilization probability update amount $\Delta P'_i$ is derived by the following equation.

[Equation 12]

$$\Delta P'_i = \frac{1}{n-1} \left[ \left( \alpha_i \sum_{x_{1,j} > x_{1,i}} (w_1 x_{1,j} - w_1 x_{1,i}) - \beta_i \sum_{x_{1,i} > x_{1,j}} (w_1 x_{1,i} - w_1 x_{1,j}) \right) + \left( \alpha_i \sum_{x_{2,j} > x_{1,i}} (w_2 x_{2,j} - w_1 x_{1,i}) - \beta_i \sum_{x_{1,i} > x_{2,j}} (w_1 x_{1,i} - w_2 x_{2,j}) \right) \right] \quad (12)$$

Figure 4:
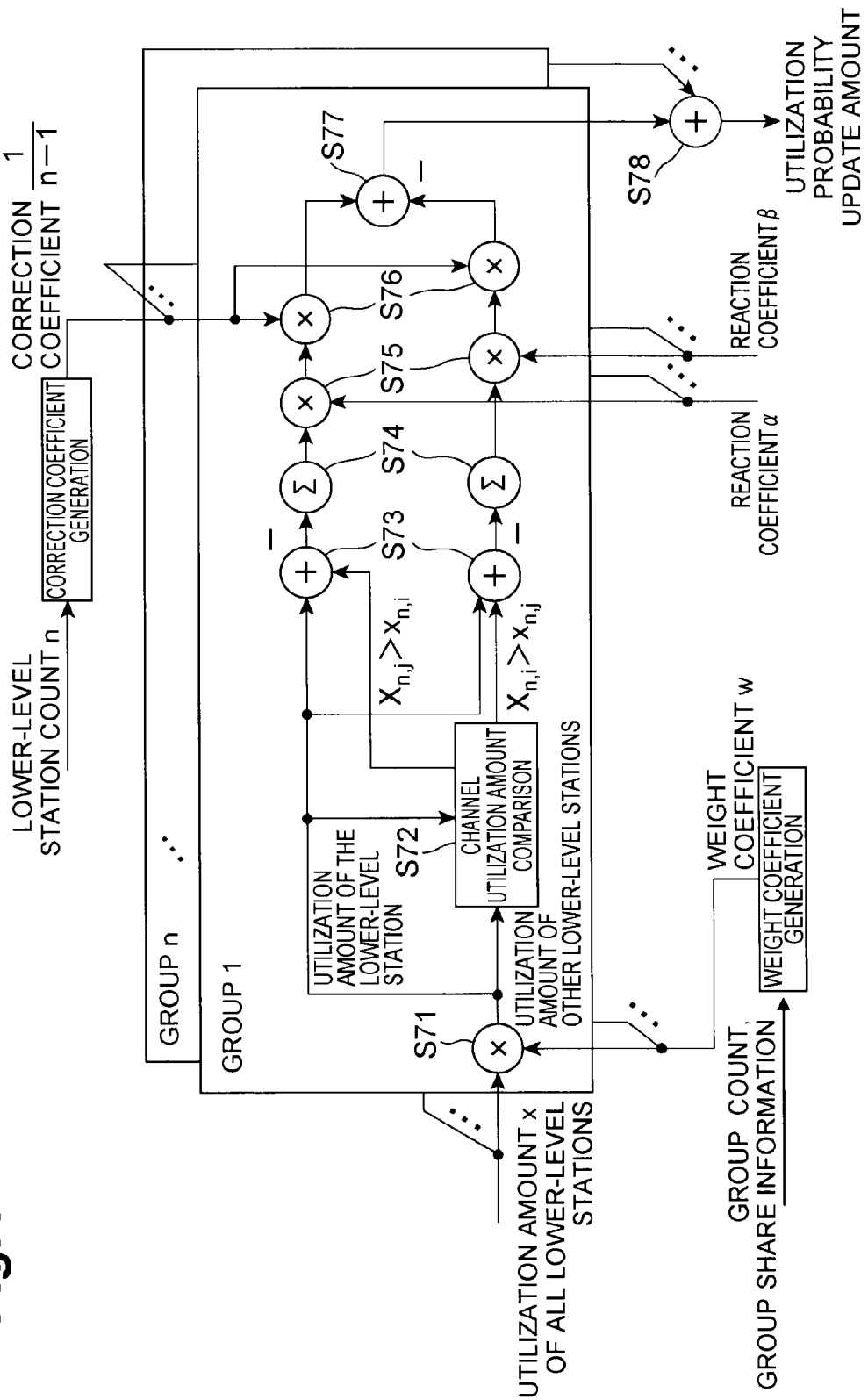
FIG. 4 is a diagram depicting the processing in the update amount calculation unit shown in FIG. 2.

FIG. 4 is a diagram depicting the processing of the above Equations (1) to (12) in the update amount calculation unit 18. First the channel utilization amount of all the lower-level stations is multiplied by the weight coefficient generated based on the group count and group share information (step S71). Then the channel utilization amount $x_{n,i}$ of the lower-level station (lower-level station 10a) and the channel utilization amount $x_{n,j}$ of another lower-level station (e.g. lower-level station 10b) are compared, and high rank lower-level station information which satisfies the relationship of $x_{n,j} > x_{n,i}$ and low rank lower-level station information which satisfies the relationship of $x_{n,i} > x_{n,j}$ are generated (step S72). The generated high rank lower-level station information and low rank lower-level station information are added with the channel utilization amount of the each lower-level station respectively (step S73). The above processing is performed for all of one or more other lower-level stations, and the result thereof is summed up (step S74).

Then the summed value on the high rank lower-level station information is multiplied by the reaction coefficient $\alpha$, and the summed value on the low rank lower-level station information is multiplied by the reaction coefficient $\beta$ (step S75), and these multiplication results are multiplied by the correction coefficient $1/(n-1)$ generated based on the lower-level station count n (step S76). And these values are added (step S77). This processing is performed for each group, and finally the calculation result for each group is summed up, whereby the utilization probability update amount is derived (step S78).

Figure 5:
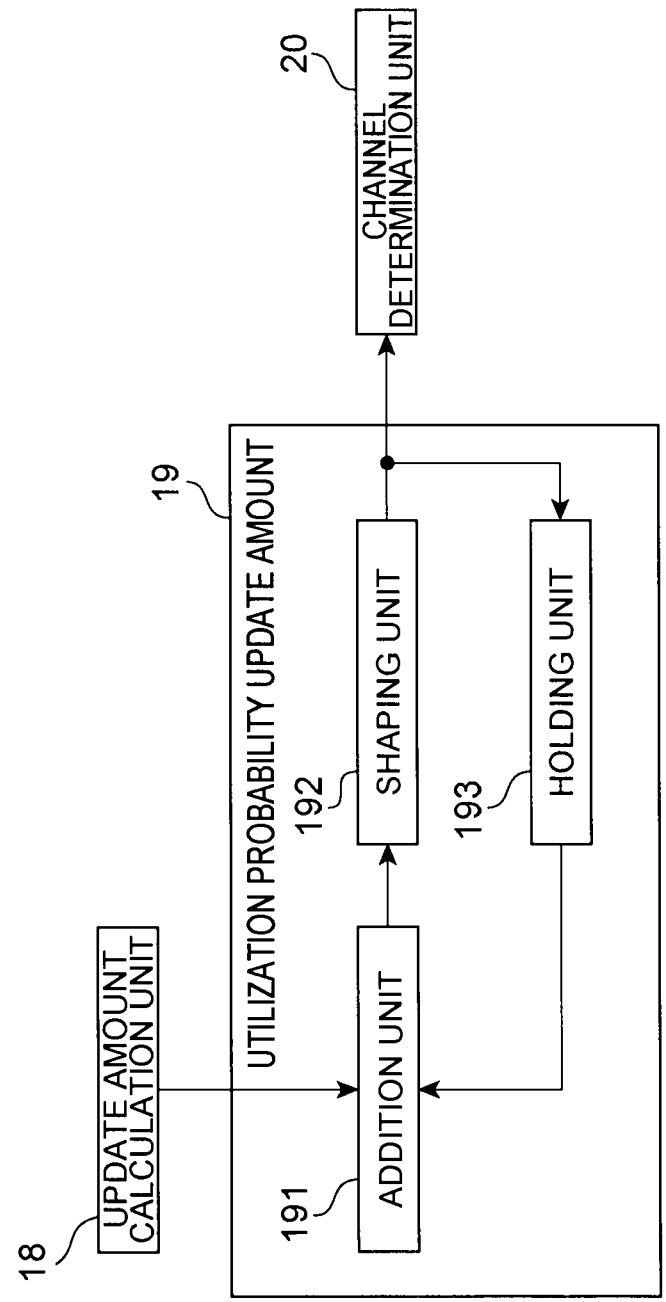
FIG. 5 is a diagram depicting the configuration of the utilization probability update unit shown in FIG. 2.

As FIG. 5 shows, the utilization probability update unit 19 has an addition unit 191, shaping unit 192 and holding unit 193.

The addition unit 191 updates the channel utilization probability by adding the utilization probability update amount which was input from the update amount calculation unit 18 to the previous channel utilization probability. The update amount which was input here is derived from the channel utilization amount for each lower-level station and channel utilization amount for each group. Therefore it can be said that the addition unit 191 is for updating the channel utilization probability based on these channel utilization amounts.

The shaping unit 192 reshapes the channel utilization probability updated by the addition unit 191 to be an appropriate value. In other words, the new channel utilization probability $p_i(t)$ is derived as follows, where $\Delta P_i$ is a utilization probability update amount and $p_i(t-1)$ is a channel utilization probability utilized for the previous transmission.

[Equation 13]

$$p_i(t) = \max(p_{min}, \min(p_{max}, (p_i(t-1) + \Delta P_i))) \quad (13)$$

Where $p_{min}$ reflects the minimum value of the channel utilization probability and $p_{max}$ reflects the maximum value of the channel utilization probability, and the relationship of $0 \leq p_{min} \leq p_{max} \leq 1$ is satisfied.

The holding unit 193 holds the channel utilization probability reshaped by the shaping unit 192. The channel utilization probability held here is utilized in the next processing to be executed by the addition unit 191.

The channel determination unit 20 judges the current channel state based on the received signal which was input from the decoding unit 11, the utilization state information which was input from the measurement unit 15, and the channel utilization probability which was input from the utilization probability update unit 19, and determines the communication channel to be utilized for communication. The channel determination unit 20 outputs the channel information on the communication channel to be utilized to the transmission unit 22.

The transmission signal generation unit 21 generates a transmission signal to transmit data via the upper-level station 30. And the transmission signal generation unit 21 assigns the upper-level station ID which indicates the upper-level station at the transmission destination, destination information which indicates the address of the receiver (e.g. IP address), a lower-level station ID which indicates the lower-level station, and a group ID of a group to which the lower-level station belongs, to the transmission signal. The transmission signal generation unit 21 outputs the transmission signal to which each of the above mentioned information is assigned, to the transmission unit 22.

The transmission unit 22 encodes the transmission signal which was input from the transmission signal generation unit 21, and transmits it. By this, the transmission signal is transmitted to the lower-level station 10 of the receiver via the upper-level station 30. To perform this control, the transmission unit 22 measures the signal transmission state in the communication channel indicated by this channel information, based on the channel information which was input from the channel determination unit 20. In concrete terms, in order to avoid collision with communication which is being performed by another lower-level station, a signal in a communication to be utilized is received, and the reception intensity of this signal is compared with a predetermined threshold, whereby it is judged whether another lower-level station is communicating in the communication channel or not. If it is judged that the communication channel is open, the transmission unit 22 transmits the transmission data utilizing this communication channel. In this case, encoding processing, modulation processing and transmission power control or the like are executed to utilize the communication channel efficiently.

Figure 6:
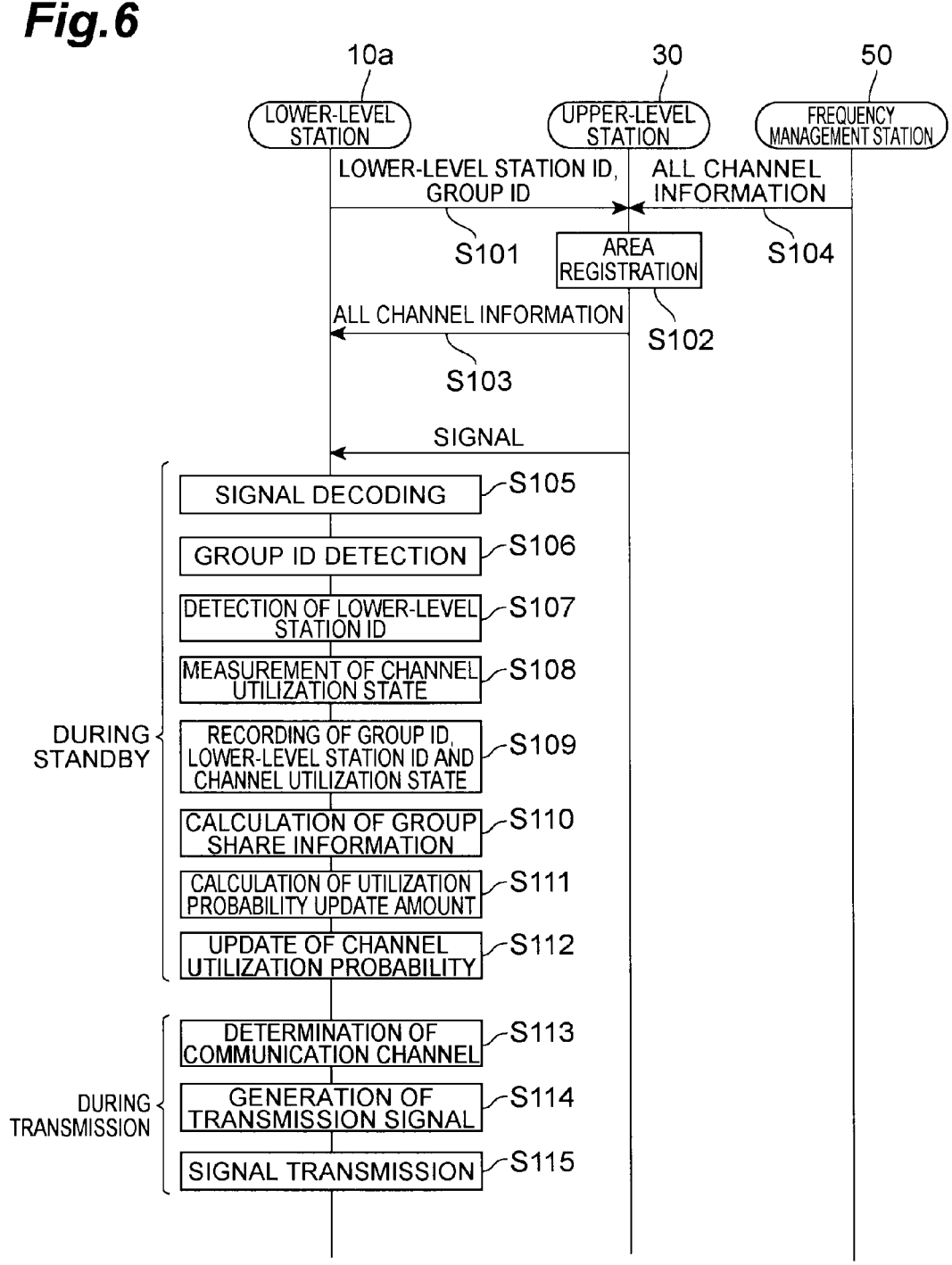
FIG. 6 is a sequence diagram depicting the processing of the radio communication system shown in FIG. 1.

The processing of the radio communication system 1 shown in FIG. 1 will now be described with reference to FIG. 6. FIG. 6 is a sequence diagram depicting the processing of the radio communication system 1.

The lower-level station 10a transmits the lower-level station ID unique to the lower-level station 10a and the group ID of the group to which the lower-level station 10a belongs, to the upper-level station 30 in order to notify the presence of this lower-level station 10a to the upper-level station (step S101). When these lower-level station ID and group ID are received by the upper-level station 30, the area registration processing is performed (step S102), and all channel information which indicates all the communication channels that can be utilized is notified to the lower-level station 10a, along with the registration completion notice (not illustrated) (step S103). This all channel information is notified from the frequency management station 50 to the upper-level station 30 (step S104).

The processing in steps S105 to S112 to be described herein below is performed when the lower-level station 10a is in standby state.

In standby state, a signal which was transmitted from the other lower-level station 10b via the upper-level station 30 is decoded (step S105), the group ID is detected from the decoded received signal (step S106), and the lower-level station ID is detected from this received signal (step S107). And the channel utilization state of the group and the lower-level station 10b corresponding to the group ID and the lower-level station ID is measured (step S108). Then the group ID, lower-level station ID and channel utilization state are recorded in the database (step S109), and the group share information is calculated based on the recorded group ID and lower-level station ID (step S110).

Then the utilization probability update amount is calculated based on the group ID, lower-level station ID, channel utilization state, and calculated group share information (step S111), and the channel utilization probability is updated based on the utilization probability update amount (step S112).

Now the processing when the lower-level station 10a transmits data will be described.

When data is transmitted, a communication channel to be utilized for transmission is determined based on the received signal, channel utilization state and channel utilization probability (step S113). A transmission signal is then generated, and the upper-level station ID, address information, lower-level station ID to indicate the lower-level station, and group ID are assigned to the signal (step S114). This transmission signal is transmitted via the determined communication channel (step S115).

The above description is based on the assumption that each lower-level station belongs to one group, however a lower-level station may belong to a plurality of groups in some cases. For example, if the communication service provider and the communication network provider are different, a lower-level station using these providers must belong to a plurality of groups to perform communication.

The present invention can also be applied to the case of each lower-level station belonging to a plurality of groups in different hierarchies. The processing of the utilization probability update amount calculation unit will now be described in detail.

It is assumed that there are three middle-level stations (e.g. service providers S1, S2 and S3), and two upper-level stations (e.g. network providers N1 and N2) which rank at a higher level. And it is assumed that the middle-level stations S1 and S2 operate using the network of the upper-level station N1, and the middle-level station S3 operates using the network of the upper-level station N2. In this environment, the following five conditions must be satisfied in order to satisfy impartiality both in unit of lower-level station and in unit of group at the same time:

1) the degree of satisfaction is impartial among the lower-level stations belonging to a same middle-level station;
2) the degree of satisfaction is impartial among the lower-level stations belonging to different middle-level stations;
3) the degree of satisfaction is impartial among the middle-level stations belonging to a same upper-level station;
4) the degree of satisfaction is impartial among the middle-level stations belonging to different upper-level stations; and
5) the degree of satisfaction is impartial among different upper-level stations.

The utility function of each middle-level station is given by the following equations.

[Equation 14]

$$U_{u1}(x_{1,i}) = U_{ui}(x_{i,m}) \quad (14)$$

where i=1, 2, 3

[Equation 15]

$$U_{u1}(x_{1,i}) = U_{uj}(x_{j,m}) \quad (15)$$

where i,j=1,2,3 and i≠j

[Equation 16]

$$U_{S1}(X_{S1,N1}) = U_{S2}(X_{S2,N1}) \quad (16)$$

[Equation 17]

$$U_{S1}(X_{S1}) = U_{S3}(X_{S3}) \quad (17)$$

[Equation 18]

$$U_{N1}(X_{N1}) = U_{N2}(X_{N2}) \quad (18)$$

Here the following equations are established.

[Equation 19]

$$U_{u1}(x_{1,i}) = w_1 x_{1,j} - \frac{1}{n-1}\left[\left(\alpha_i \sum_{x_{1,j}>x_{1,i}}(w_1 x_{1,j} - w_1 x_{1,i}) + \beta_i \sum_{x_{1,i}>x_{1,j}}(w_1 x_{1,j} - w_1 x_{1,j})\right) + \left(\alpha_i \sum_{x_{2,j}>x_{1,i}}(w_2 x_{2,j} - w_1 x_{1,i}) + \beta_i \sum_{x_{1,i}>x_{2,j}}(w_1 x_{1,i} - w_2 x_{2,j})\right) + \left(\alpha_i \sum_{x_{3,j}>x_{1,i}}(w_3 x_{3,j} - w_1 x_{1,i}) + \beta_i \sum_{x_{1,i}>x_{3,j}}(w_1 x_{1,i} - w_3 x_{3,j})\right)\right] \quad (19)$$

[Equation 20]

$$U_{u2}(x_{2,i}) = w_2 x_{2,j} - \frac{1}{n-1}\left[\left(\alpha_i \sum_{x_{1,j}>x_{2,i}}(w_1 x_{1,j} - w_2 x_{2,i}) + \beta_i \sum_{x_{2,i}>x_{1,j}}(w_2 x_{2,i} - w_1 x_{1,j})\right) + \left(\alpha_i \sum_{x_{2,j}>x_{2,i}}(w_2 x_{2,j} - w_2 x_{2,i}) + \beta_i \sum_{x_{2,i}>x_{2,j}}(w_2 x_{2,i} - w_2 x_{2,j})\right) + \left(\alpha_i \sum_{x_{3,j}>x_{2,i}}(w_3 x_{3,j} - w_2 x_{2,i}) + \beta_i \sum_{x_{2,i}>x_{3,j}}(w_2 x_{2,i} - w_3 x_{3,j})\right)\right] \quad (20)$$

[Equation 21]

$$U_{u3}(x_{3,i}) = w_3 x_{3,i} - \frac{1}{n-1}\left[\left(\alpha_i \sum_{x_{1,j}>x_{3,i}}(w_1 x_{1,j} - w_3 x_{3,i}) + \beta_i \sum_{x_{3,i}>x_{1,j}}(w_3 x_{3,i} - w_1 x_{1,j})\right) + \left(\alpha_i \sum_{x_{2,j}>x_{3,i}}(w_2 x_{2,j} - w_3 x_{3,i}) + \beta_i \sum_{x_{3,i}>x_{2,j}}(w_3 x_{3,i} - w_2 x_{2,j})\right) + \left(\alpha_i \sum_{x_{3,j}>x_{3,i}}(w_3 x_{3,j} - w_3 x_{3,i}) + \beta_i \sum_{x_{3,j}>x_{3,i}}(w_3 x_{3,i} - w_3 x_{3,j})\right)\right] \quad (21)$$

[Equation 22]

$$U_{S1}(X_{S1}) = w_{N1} X_{S1} - \frac{1}{n_s - 1}\left[\sum_{X_{S2}>X_{s1}}(w_{N1}X_{S2} - w_{N1}X_{S1}) + \sum_{X_{s1}>X_{s2}}(w_{N1}X_{S1} - w_{N1}X_{S2}) + \left(\sum_{X_{S3}>X_{S1}}(w_{N2}X_{S3} - w_{N1}X_{S1}) + \sum_{X_{S1}>X_{S3}}(w_{N1}X_{S1} - w_{N2}X_{S3})\right)\right] \quad (22)$$

[Equation 23]

$$U_{S2}(X_{S2}) = w_{N1} X_{S2} - \frac{1}{n_s - 1}\left[\sum_{X_{s1}>X_{s2}}(w_{N1}X_{S1} - w_{N1}X_{S2}) + \sum_{X_{s2}>X_{s1}}(w_{N1}X_{S2} - w_{N1}X_{S1}) + \left(\sum_{X_{S3}>X_{S1}}(w_{N2}X_{S3} - w_{N1}X_{S2}) + \sum_{X_{S2}>X_{S3}}(w_{N1}X_{S2} - w_{N2}X_{S3})\right)\right] \quad (23)$$

[Equation 24]

$$U_{S3}(X_{S3}) = w_{N2} X_{S3} - \frac{1}{n_s - 1}\left[\sum_{X_{S3}>X_{s2}}(w_{N2}X_{S3} - w_{N1}X_{S2}) + \sum_{X_{s2}>X_{s1}}(w_{N1}X_{S2} - w_{N2}X_{S3}) + \left(\sum_{X_{S1}>X_{S2}}(w_{N1}X_{S1} - w_{N1}X_{S2}) + \sum_{X_{S2}>X_{S1}}(w_{N1}X_{S2} - w_{N1}X_{S1})\right)\right] \quad (24)$$

[Equation 25]

$$U_{N1}(X_{N1}) = X_{N1} - \frac{1}{n_N - 1}\left[\sum_{X_{N2}>X_{N1}}(X_{N2} - X_{N1}) + \sum_{X_{N1}>N_{N2}}(X_{N1} - X_{N2})\right] \quad (25)$$

[Equation 26]

$$U_{N2}(X_{N2}) = X_{N2} - \frac{1}{n_N - 1}\left[\sum_{X_{N1}>X_{N2}}(X_{N1} - X_{N2}) + \sum_{X_{N2}>N_{N1}}(X_{N2} - X_{N1})\right] \quad (26)$$

In each of the above equations, $X_{N1}$ and $X_{N2}$ denote the total channel utilization amounts of the lower-level stations belonging to the upper-level stations N1 and N2 respectively. $X_{S1}$, $X_{S2}$ and $X_{S3}$ denote the total channel utilization amounts of the lower-level stations belonging to the middle-level stations S1, S2 and S3 respectively, and $n_s$ and $n_g$ denote the number of service providers and the number of upper-level stations respectively. Therefore $w_1$, $w_2$, $w_3$, $w_{N1}$ and $w_{N2}$, that satisfy the relationships of Equations (14) to (18), must be discovered. To calculate $X_{N1}$, $X_{N2}$, $X_{S1}$, $X_{S2}$ and $X_{S3}$, the database update period may be utilized, or a separate update period may be set. In the first embodiment, these values are calculated using the database update period.

To satisfy Equation (14), $X_{1,i}=X_{1,m}$ must be established. In order to satisfy Equation (15) at this time, the following relationship must be satisfied.

[Equation 27]

$$w_1 x_{1,j} = w_2 x_{2,m} = w_3 x_{3,k} \quad (27)$$

In the same manner, $X_{S1}=X_{S2}$ is derived from Equation (16), and the following equation is established by this and Equation (17).

[Equation 28]

$$\frac{w_{N1}}{w_{N2}} = \frac{X_{s3}}{X_{s1}} \quad (28)$$

Equation (17) can be rewritten as follows.

[Equation 29]

$$w_{N1}nf_1x_{1,i} = w_{N1}nf_2x_{2,m} = w_{N2}nf_3x_{3,k} \quad (29)$$

The following equation is established by Equations (27) and (29).

[Equation 30]

$$w_2 = \frac{w_{s2}f_2}{w_{s1}f_1}w_1 = \frac{w_{s2}f_2}{w_{s3}f_3}w_3 \quad (30)$$

Based on $X_{S1}=X_{S2}$ in Equation (18), the following equation is established.

[Equation 31]

$$2w_{N1}X_{s1} = w_{N2}X_{s3} \quad (31)$$

Therefore the following equation is established by Equations (28) and (31).

[Equation 32]

$$\frac{w_{N1}}{w_{N2}} = 2 \quad (32)$$

From Equations (30) and (32), the weight coefficients $w_1$, $w_2$ and $w_3$ are derived as the following relative relationship.

[Equation 33]

$$w_2 = \frac{f_2}{f_1}w_1 = \frac{w_{N1}f_2}{w_{N2}f_3}w_3 = \frac{f_2}{2f_3}w_3 \quad (33)$$

By controlling the channel utilization probability using the weight information determined like this, an environment which can ensure impartiality among the lower-level stations, among middle-level stations and among upper-level stations at the same time can be constructed.

As mentioned above, according to the first embodiment, the lower-level station ID and group ID are detected from the received signal, and the channel utilization state is measured based on the received signal, and the channel utilization amount for each lower-level station and channel utilization amount for each group are calculated based on this information. Then the channel utilization probability is updated based on each of the calculated channel utilization amounts, and a communication channel to be utilized for transmission is determined based on the channel utilization probability after the update. Thereby a communication channel to be utilized can be determined considering not only the channel utilization amount for each lower-level station, but also the channel utilization amount for each group. In other words, the communication channels can be impartially allocated both among the lower-level stations and among groups. As a result, an unnecessary collision of signals can be decreased, and utilization efficiency of the communication channels can be further improved. Also a stable communication environment can be provided to the users of the radio communication system 1.

Also according to the first embodiment, the channel utilization amount of another lower-level station 10b can be measured based on the communication channel utilization time of each lower-level station (lower-level stations 10a and 10b). In the radio communication system 1, the communication channel utilization time, that is, the transmission time, increases/decreases depending on the data volume to be transmitted, so measuring the channel utilization amount based on the communication channel utilization time is effective to determine an appropriate communication channel. This also can improve the utilization efficiency of the communication channels.

In order to evaluate the effect of the first embodiment, the gain of each lower-level station and the gain of each group are compared between the first embodiment and a conventional method. The parameters to be utilized herein below are the same as those mentioned above.

In a conventional method, the gain of each lower-level station is controlled to be impartial, so ideally the gain of each lower-level station becomes the same, that is, $X_{1,i}=X_{2,i}$. In the case of the gain of each group, however, the gain of group 1 is $nf_1x_{1,i}$ and the gain of group 2 is $nf_2x_{2,i}$, and impartiality is not ensured among groups, unless the number of lower-level stations is the same for both groups.

In the first embodiment, on the other hand, weight coefficients are utilized to control impartiality among groups. Therefore the gain of a lower-level station belonging to group 1 is given by the following equation.

[Equation 34]

$$x_{1,i} = \frac{f_2}{f_1}x_{2,i} = \frac{(1-f_1)}{f_1}x_{2,i} \quad (34)$$

As a result, in groups 1 and 2, a same gain is acquired for the lower-level stations within a same group, and impartiality is implemented within each group. At the same time, the gain in unit of group is given by the following equation, where impartial gain control is implemented.

[Equation 35]

$$nf_1x_{1,i} = nf_1 \times \frac{f_2}{f_1}x_{2,i} = nf_2x_{2,i} \quad (35)$$

This effect of the present invention will be shown by using concrete numerical value examples. Now it is assumed that the total number of lower-level stations n=1000, $f_1$=0.8 and $f_2$=0.2. The conventional method controls such that the gains of all the lower-level stations become impartial regardless the group to which the lower-level station belongs, so the gain of each lower-level station in this case is 1/1000. As a result, the gain in each group becomes 0.8 for group 1 and 0.2 for group 2, in proportion to the number of lower-level stations belonging to the respective group.

In the case of the first embodiment, on the other hand, the gain of each lower-level station is 1/1600 if a station belongs to group 1, and 1/400 if a station belongs to group 2. In this case, the gain for each group is 1/2 respectively, which means that impartiality among lower-level stations within each group and impartiality among groups are implemented.

In this way, according to the first embodiment, impartiality among groups is ensured at the same time with impartiality among lower-level stations, so sustainable relationships can be implemented in a communication environment where communication channels are shared. As a result, each lower-level station can communicate according to an appropriate channel utilization probability, avoiding unnecessary signal collision, and therefore a good communication environment can be provided to all lower-level stations and groups that utilize communication channels.

(Second Embodiment)

A difference of the second embodiment from the first embodiment is that group share is calculated not by the lower-level station 10, but by the upper-level station 30. Description on the other configuration of the second embodiment, which is the same as the first embodiment, is omitted.

Figure 7:
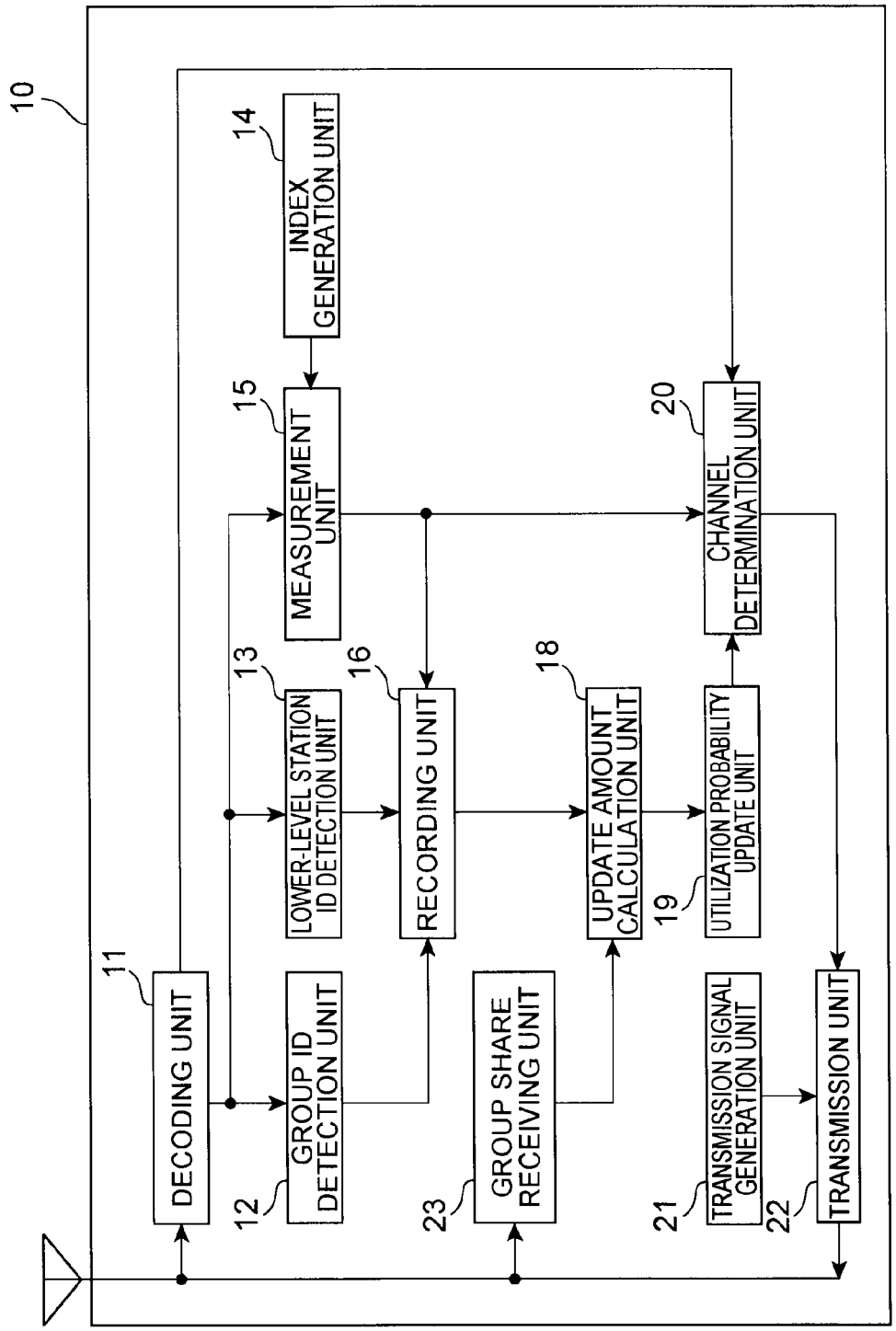
FIG. 7 is a diagram depicting a functional configuration of a lower-level station according to a second embodiment.
Figure 8:
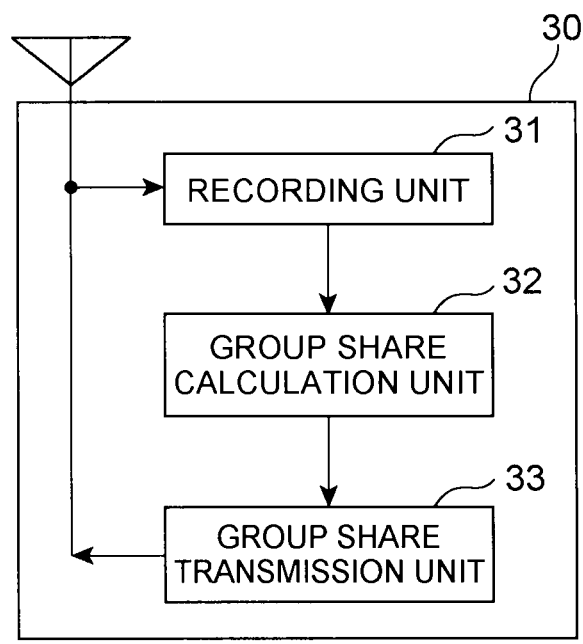
FIG. 8 is a diagram depicting a functional configuration of an upper-level station according to the second embodiment.
Figure 9:
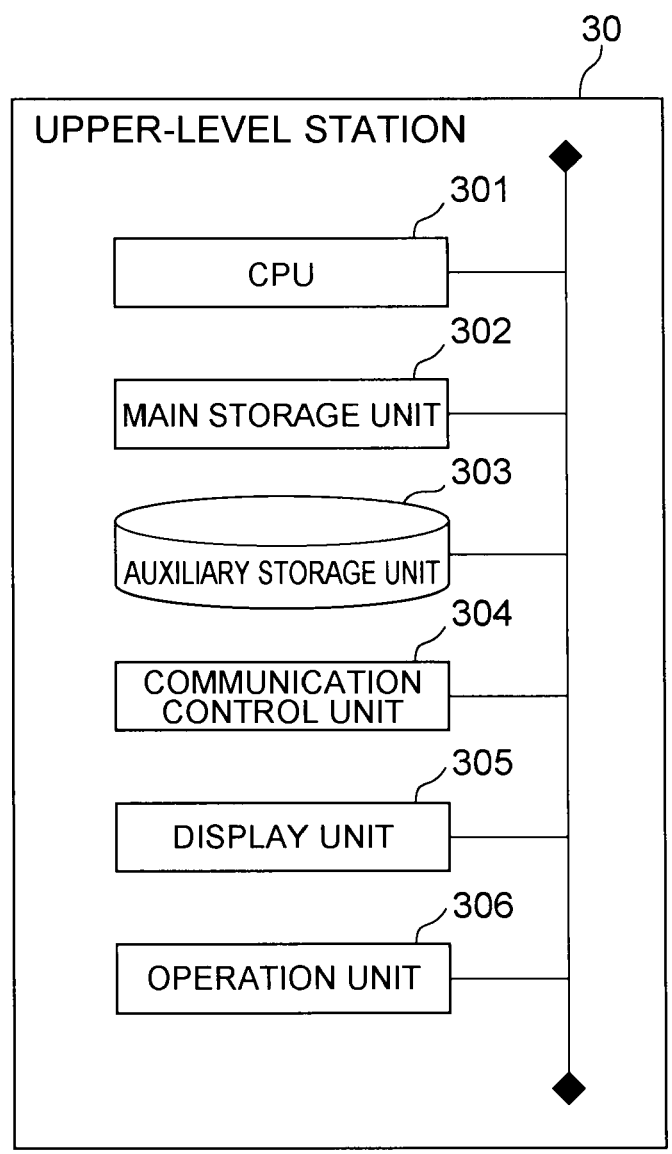
FIG. 9 is a block diagram depicting the hardware of the upper-level station shown in FIG. 8.

FIG. 7 and FIG. 8 are diagrams depicting functional configurations of a lower-level station 10 and an upper level-station 30 according to the second embodiment. FIG. 9 is a block diagram depicting the hardware of the upper-level station 30 shown in FIG. 8. According to the second embodiment, the lower-level station 10 has a group share receiving unit 23 for receiving the group share information from the upper-level station 30, and outputting the information to the update amount calculation unit 18. The upper-level station 30, on the other hand, has a recording unit 31, group share calculation unit 32, and group share transmission unit 33 as the functional composing elements.

As FIG. 9 shows, the upper-level station 30 is comprised of, for example, a CPU 301 which executes an operating system and application programs, a main storage unit 302 such as ROM and RAM, an auxiliary storage unit 303 such as memory, a communication control unit 304 which performs data communication via the upper-level station 30, a display unit 305 such as a monitor, and an operation unit 306 such as a keyboard. Each function described with reference to FIG. 8 is implemented by having the CPU 301 and the main storage unit 302 shown in FIG. 9 read predetermined software, and having the communication control unit 304 operate under control of the CPU 301, and also by having the main storage unit 302 and auxiliary storage unit 303 read and write data.

The recording unit 31 detects a lower-level station ID and group ID from a signal from the lower-level station 10 connected to the upper-level station 30 for area registration, and records the lower-level station ID and the group ID in the database (not illustrated). Based on the group ID and lower-level station ID recorded in the database, the recording unit 31 calculates a number of group IDs (group count) acquired during the database update period and a number of lower-level station IDs (lower-level station count) acquired during this update period. And the recording unit 31 outputs the group count and lower-level station count to the group share calculation unit 32.

The group share calculation unit 32 calculates the group share information which indicates groups and a number of lower-level stations belonging to the groups respectively, based on the group count and the lower-level station count which were input from the recording unit 31. The group share calculation unit 32 outputs this group share information to the group share transmission unit 33.

The group share transmission unit 33 transmits the group share information, which was input from the group share calculation unit 32, to the lower-level station 10.

Figure 10:
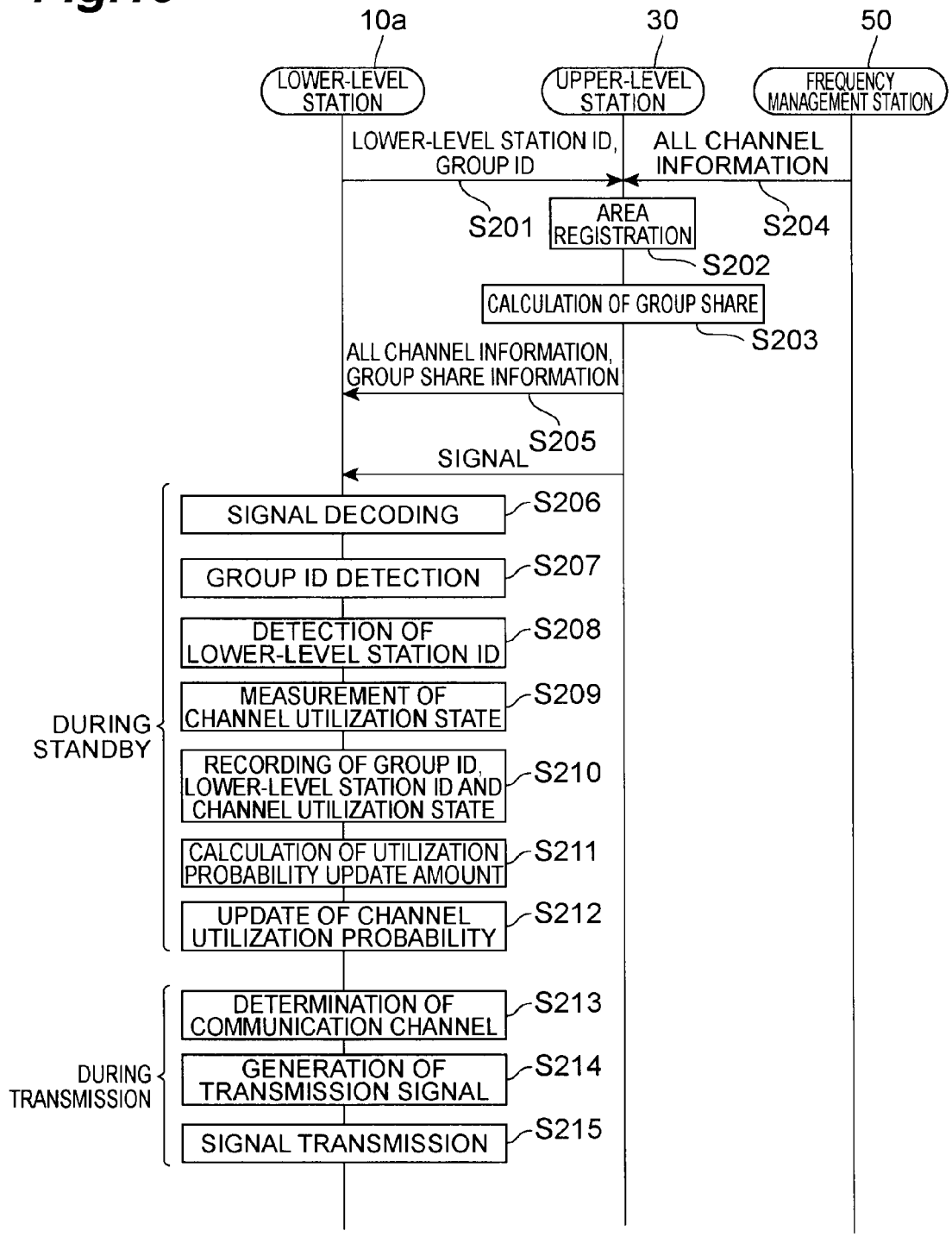
FIG. 10 is a sequence diagram depicting the processing of the radio communication system according to the second embodiment.

The processing of the radio communication system 1 according to the second embodiment will now be described with reference to FIG. 10. FIG. 10 is a sequence diagram depicting the processing of the radio communication system 1.

A characteristic portion of the second embodiment is that based on the lower-level station ID and group ID recorded at the area registration (step S202), the group share is calculated by the group share calculation unit 32 of the upper-level station 30 (step S204), and the calculated group share information is transmitted to the lower-level station 10a along with all channel information (step S205). The other processings shown in FIG. 10 are the same as the first embodiment.

According to the second embodiment, the upper-level station 30 executes the calculation of the group share. Therefore the group share can be accurately calculated without being influenced by the processing capability of the lower-level station 10 and the communication environment around the lower-level station 10 (e.g. deterioration of communication environment due to obstacles, limit of communicable distance between lower-level station 10 and upper level station 30).

If a separate control line is laid between upper-level stations, the area condition of a lower-level station 10 acquired by one upper-level station may be shared by a plurality of upper-level stations, based on which group share information is calculated. Since the group share is calculated based on the area condition of the lower-level station 10 collected by each upper-level station, the accuracy of the group share information can be improved.

If the lower-level station belongs to a plurality of groups in different hierarchies, both the mode shown in the first embodiment and the mode shown in the second embodiment may be operated. Now assume that an environment is comprised of three types of stations: upper-level stations, middle-level stations and lower-level stations, where the gain of a middle-level station is determined by control with an upper-level station and the gain of a lower-level station is determined by control with a middle-level station. In this case, control between the middle-level station and the upper-level station may be executed by the method shown in the first embodiment, and control between the lower-level station and the middle-level station by the method shown in the second embodiment. In the same way, control between the middle-level station and the upper-level station may be executed by the method shown in the second embodiment, and control between the lower-level station and the middle-level station by the method shown in the first embodiment.

(Third Embodiment)

A difference of the third embodiment from the first embodiment is that the upper-level station 30 executes the series of processings from the detection of the group ID and lower-level station ID to the determination of a communication channel to be utilized by the lower-level station 10. Description on other configurations of the third embodiment, which are the same as the first embodiment, is omitted.

Figure 11:
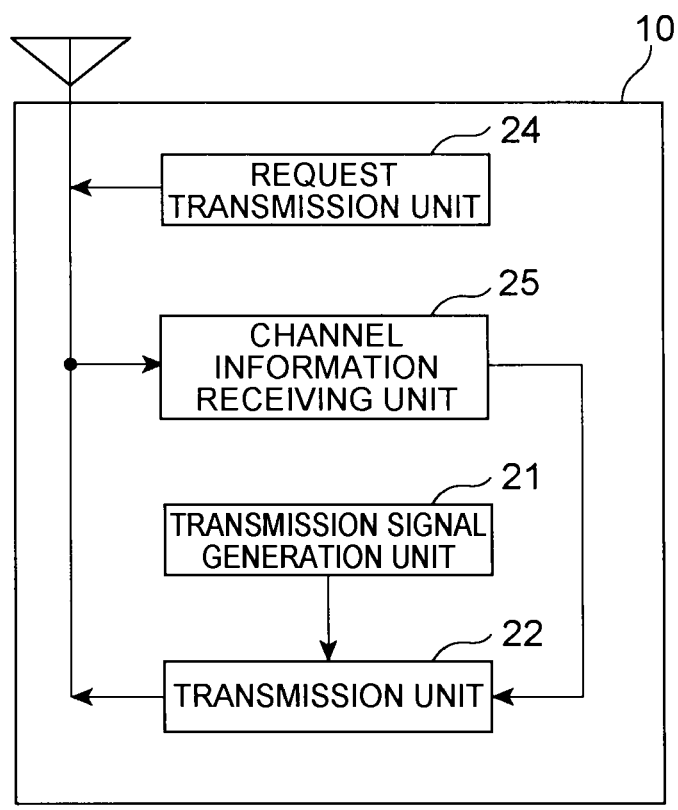
FIG. 11 is a diagram depicting a functional configuration of a lower-level station according to a third embodiment.
Figure 12:
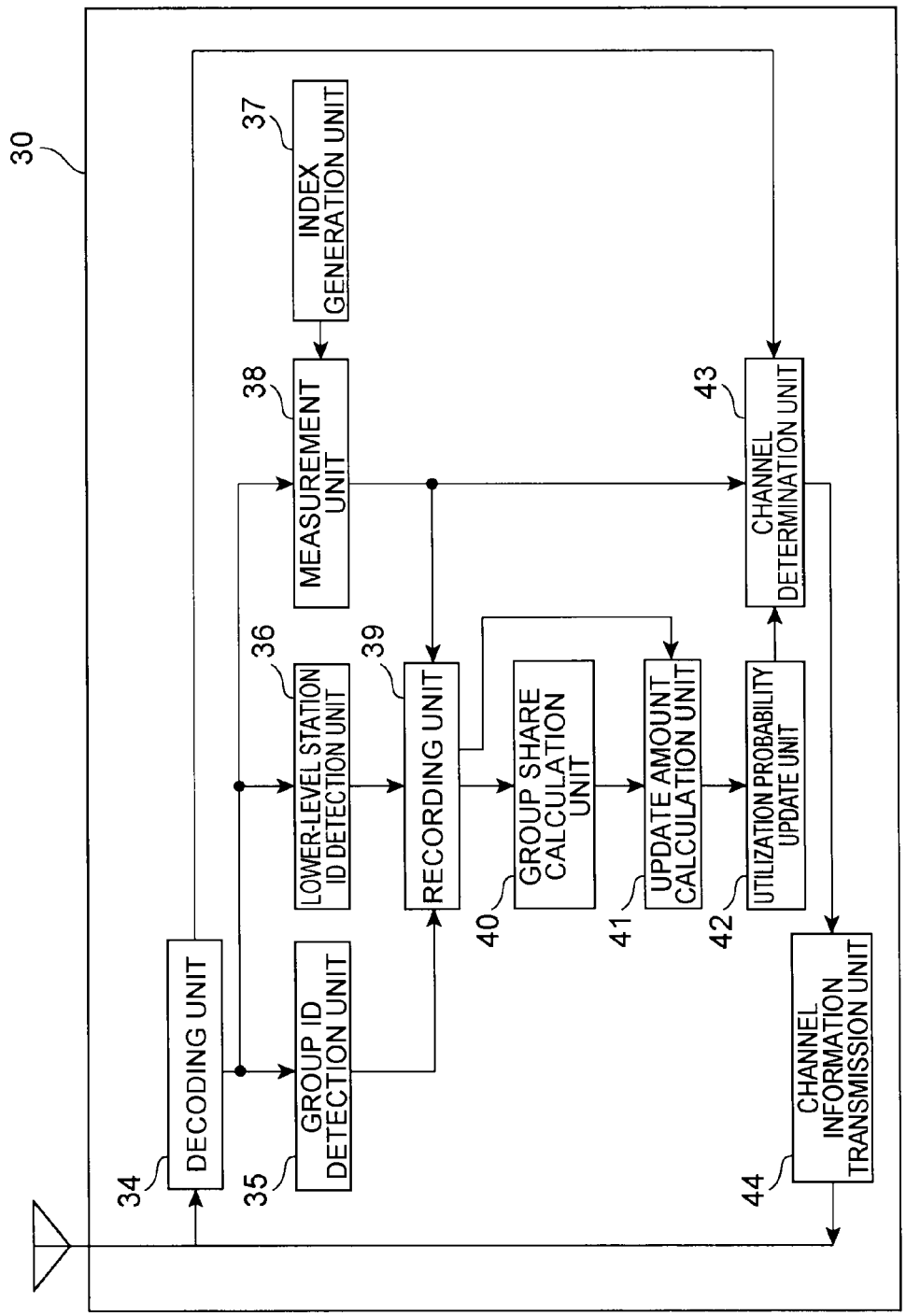
FIG. 12 is a diagram depicting a functional configuration of an upper-level station according to the third embodiment.

The functional configuration of a lower-level station 10 and an upper-level station 30 according to the third embodiment will be described first with reference to FIG. 11 and FIG. 12. FIG. 11 and FIG. 12 are diagrams depicting the functional configuration of the lower-level station 10 and the upper-level station 30 respectively.

The lower-level station 10 includes a request transmission unit (request transmission unit) 24, channel information receiving unit (channel information receiving unit) 25, transmission signal generation unit 21 and transmission unit 22 as the functional composing elements.

The request transmission unit 24 transmits a channel request to have the upper-level station 30 determine a communication channel for the lower-level station 10 to utilize for transmission to the upper-level station 30. The channel information receiving unit 25 receives channel information which was transmitted from the upper-level station 30 according to the transmitted channel request, and outputs this channel information to the transmission unit 22. Thereby the lower-level station 10 can transmit the transmission signal generated by the transmission signal generation unit 21 via the transmission unit 22, utilizing the communication channel indicated by the channel information.

The upper-level station 30 includes a decoding unit 34, group ID detection unit (detection unit) 35, lower-level station ID detection unit (detection unit) 36, index generation unit 37, measurement unit (measurement unit) 38, recording unit 39, group share calculation unit 40, update amount calculation unit (calculation unit) 41, utilization probability update unit (update unit) 42, channel determination unit (determination unit) 43, and channel information transmission unit (channel information transmission unit) 44 as the functional composing elements. Of these composing elements, the channel information transmission unit 44 transmits the communication channel information, which was input from the channel determination unit 43, to the lower-level station 10. The functions of the other composing elements are the same as those of the first embodiment.

Figure 13:
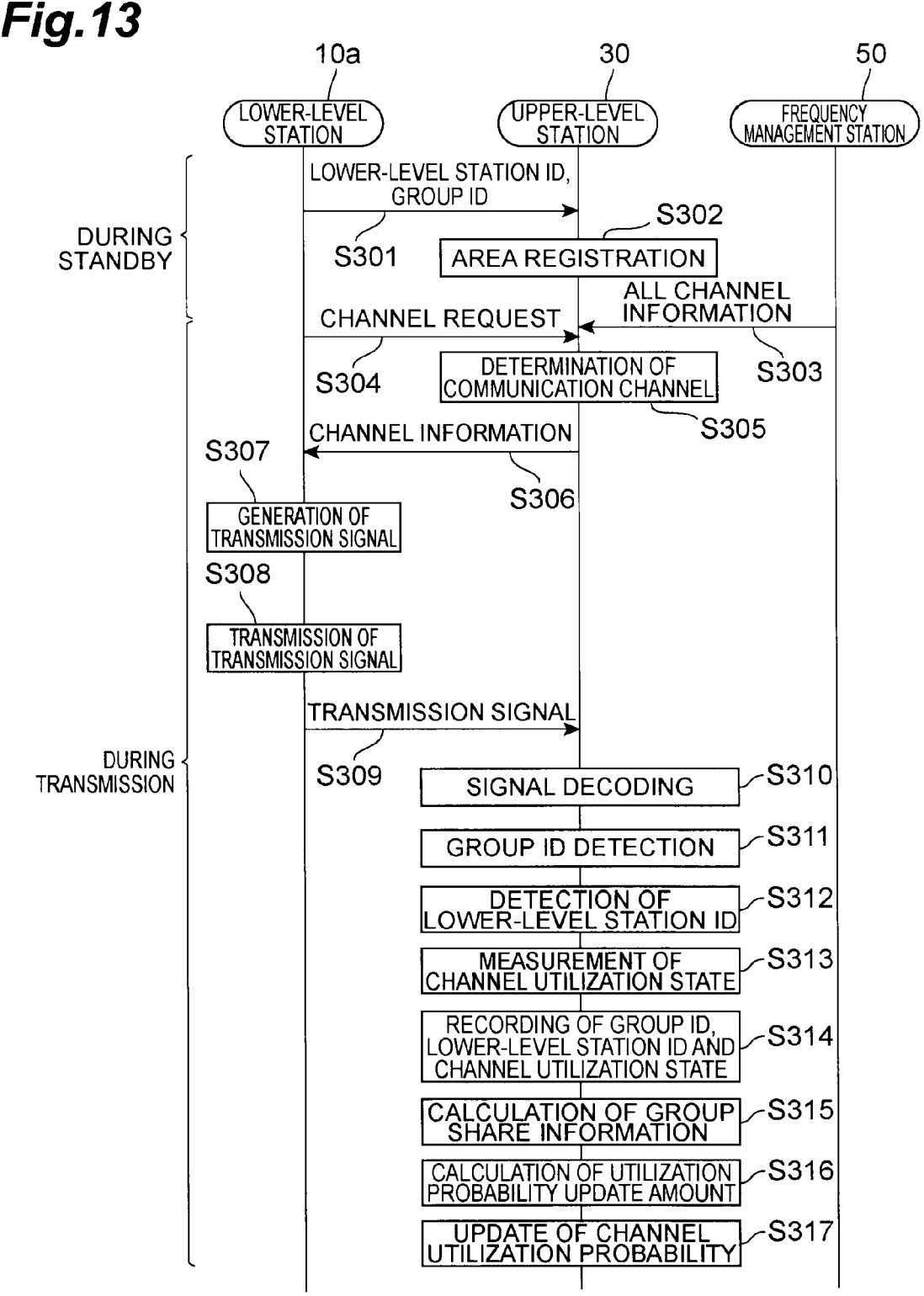
FIG. 13 is a sequence diagram depicting the processing of the radio communication system according to the third embodiment.

The processing of the radio communication system 1 according to the third embodiment will now be described with reference to FIG. 13. FIG. 13 is a sequence diagram depicting the processing of the radio communication system 1.

Characteristic aspects of the third embodiment are that a communication channel is determined by the upper-level station 30 when the lower-level station 10a transmits the transmission signal, and that the series of processings from the detection of various IDs to the update of channel utilization probability is executed by the upper-level station 30.

When the lower-level station 10a transmits a transmission signal, a channel request is transmitted from the lower-level station 10a to the upper-level station 30 first (step S304). Then the upper-level station 30 determines a communication channel to be utilized by the lower-level station 10a (step S305), and transmits the channel information which indicates the communication channel to the lower-level station 10a (step S306). The other processings shown in FIG. 11 are the same as those of the first embodiment. The processings from the detection of various IDs to the update of channel utilization probability (step S310 to S317) are executed by the upper-level station 30.

By the third embodiment as well, similar effects as the first embodiment can be acquired. In addition, according to the radio communication system 1 of the third embodiment, processings from the detection of the lower-level station ID and group ID to the determination of the communication channel are executed by the upper-level station 30. Therefore the processings executed by the lower-level station 10, of which processing capability is limited and of which ambient communication environment tends to deteriorate, is decreased, whereby a series of processings is performed by the upper-level station 30, which excels in processing capability and has a good communication environment. As a result, the communication channel can be must be more accurately determined.

(Fourth Embodiment)

A difference of the fourth embodiment from the first embodiment is that difference is generated between the reaction sensitivity to partiality within its group and reaction sensitivity to partiality in another group, by using an inter-group reaction coefficient. Description on other configurations of the fourth embodiment, which is the same as the first embodiment, is omitted.

The utility function of each lower-level station and the utility function of each group according to the fourth embodiment are defined as follows respectively.

[Equation 36]

$$U_{u1}(x_{1,i}) = w_1 x_{1,i} - \frac{1}{n-1}\left[A\left(\alpha_i \sum_{x_{1,j} > x_{1,i}} (w_1 x_{1,j} - w_1 x_{1,i}) + \beta_i \sum_{x_{1,i} > x_{1,j}} (w_1 x_{1,i} - w_1 x_{1,j})\right) + B\left(\alpha_i \sum_{x_{2,j} > x_{1,i}} (w_2 x_{2,j} - w_1 x_{1,i}) + \beta_i \sum_{x_{1,i} > x_{2,j}} (w_1 x_{1,i} - w_2 x_{2,j})\right)\right] \quad (36)$$

[Equation 37]

$$U_{u2}(x_{2,i}) = w_2 x_{2,i} - \frac{1}{n-1}\left[A\left(\alpha_i \sum_{x_{2,j} > x_{2,i}} (w_2 x_{2,j} - w_2 x_{2,i}) + \beta_i \sum_{x_{2,i} > x_{2,j}} (w_2 x_{2,i} - w_2 x_{2,j})\right) + B\left(\alpha_i \sum_{x_{1,j} > x_{2,i}} (w_1 x_{1,j} - w_2 x_{2,i}) + \beta_i \sum_{x_{2,i} > x_{1,j}} (w_2 x_{2,i} - w_1 x_{1,j})\right)\right] \quad (37)$$

[Equation 38]

$$U_{g1}(X_{g1}) = X_{g1} - \frac{1}{n_g - 1}\left[A \sum_{X_{g2} > X_{g1}} (X_{g2} - X_{g1}) + B \sum_{X_{g1} > X_{g2}} (X_{g1} - X_{g2})\right] \quad (38)$$

[Equation 39]

$$U_{g2}(X_{g2}) = X_{g2} - \frac{1}{n_g - 1}\left[A \sum_{X_{g1} > X_{g2}} (X_{g1} - X_{g2}) + B \sum_{X_{g2} > X_{g1}} (X_{g2} - X_{g1})\right] \quad (39)$$

Here A and B are inter-group reaction coefficients, and are reaction coefficients with respect to partiality within its group and with respect to partiality in another group respectively. For example, by setting the reaction coefficient A with respect to partiality within its group to be A>B (by setting the reaction coefficient A so as to react more sensitively to partiality within its group), channel utilization probability of the relevant lower-level station can be adjusted with priority. Therefore the influence of partiality generated within its group can be solved within its group, and as a result, impartiality among groups becomes more stable, and the communication environment can be further improved.

In the present environment, the utilization probability update information $\Delta P'_i$ can be given by the following equation.

[Equation 40]

$$\Delta P'_i = \frac{1}{n-1}\left[A\left(\alpha_i \sum_{x_{1,j} > x_{1,i}} (w_1 x_{1,j} - w_1 x_{1,i}) - \beta_i \sum_{x_{1,i} > x_{1,j}} (w_1 x_{1,i} - w_1 x_{1,j})\right) + B\left(\alpha_i \sum_{x_{2,j} > x_{1,i}} (w_2 x_{2,j} - w_1 x_{1,j}) - \beta_i \sum_{x_{1,i} > x_{2,j}} (w_1 x_{1,i} - w_2 x_{2,j})\right)\right] \quad (40)$$

Figure 14:
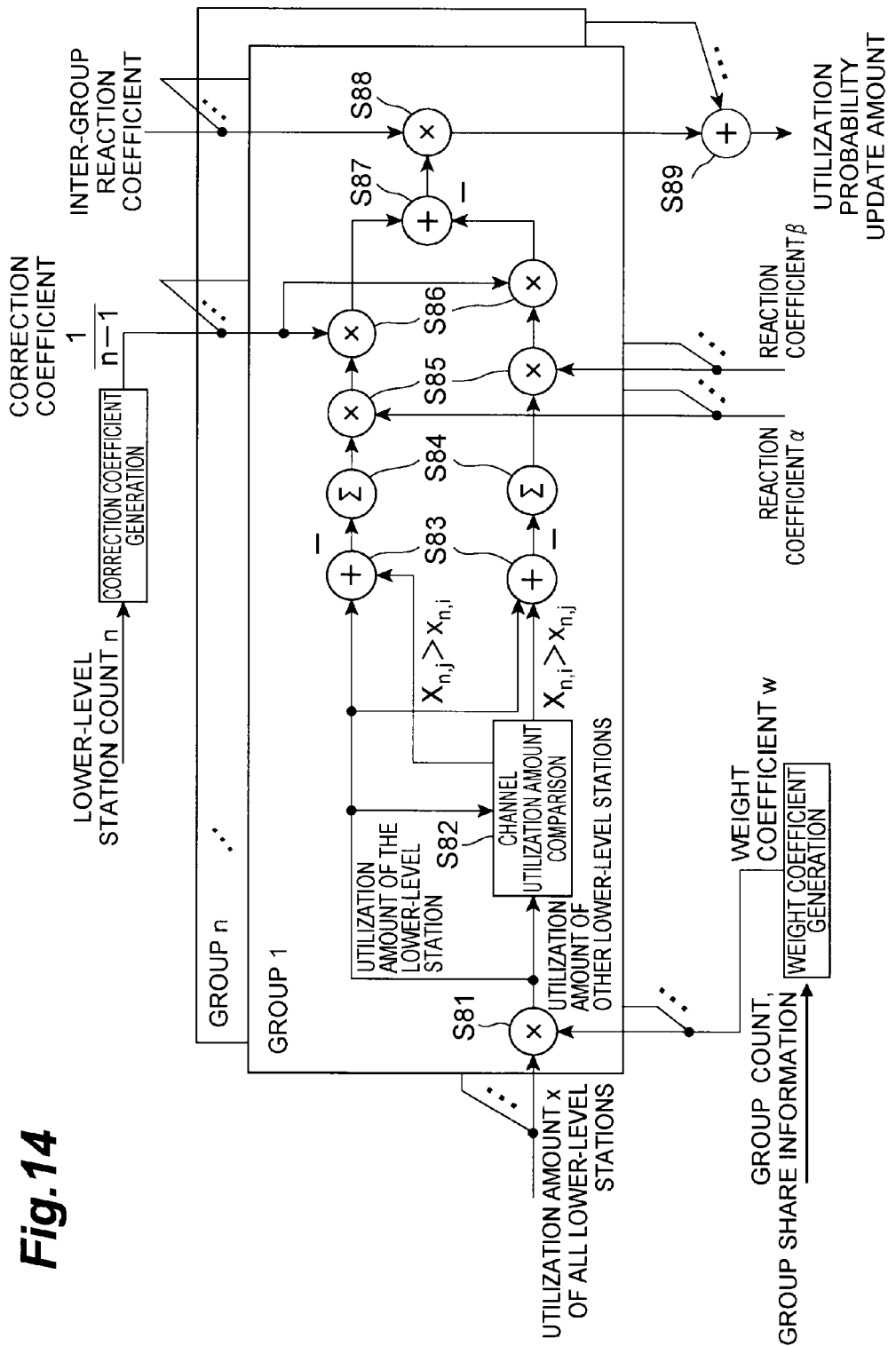
FIG. 14 is a diagram depicting the processing of an update amount calculation unit according to a fourth embodiment.

FIG. 14 is a diagram depicting the processings of the above Equations (36) to (40) in the update amount calculation unit 18. The processings in step S81 to S87 are the same as the processings in steps S71 to S77 in the first embodiment. Characteristic of the fourth embodiment is that the calculation result after the processing in step S87 is multiplied by the inter-group reaction coefficient (step S88), and the results are summed up (step S89).

(Fifth Embodiment)

A difference of the fifth embodiment from the first embodiment or fourth embodiment is that inter-group weight coefficients $W_{g1}$ and $W_{g2}$ are also utilized. The inter-group weight coefficients can be set so as to reflect the difference in priority among groups, for example. Description on the other configurations of the fifth embodiment, which is the same as the first embodiment, is omitted.

In the fifth embodiment, the utility function of each group is defined as follows respectively.

[Equation 41]

$$U_{g1}(X_{g1}) = W_{g1}X_{g1} - \frac{1}{n_g-1}\left[A\sum_{X_{g2}>X_{g1}}(W_{g2}X_{g2} - W_{g1}X_{g1}) + B\sum_{X_{g1}>X_{g2}}(W_{g1}X_{g1} - W_{g2}X_{g2})\right] \quad (41)$$

[Equation 42]

$$U_{g2}(X_{g2}) = W_{g2}X_{g2} - \frac{1}{n_g-1}\left[A\sum_{X_{g1}>X_{g2}}(W_{g1}X_{g1} - W_{g2}X_{g2}) + B\sum_{X_{g2}>X_{g1}}(W_{g2}X_{g2} - W_{g1}X_{g1})\right] \quad (42)$$

Here the following relationship must be satisfied to satisfy the relationships of Equations (6), (7) and (8) in the first embodiment.

[Equation 43]

$$W_1 n f_1 x_{1,i} = W_2 n f_2 x_{2,m} \quad (43)$$

Therefore the weight coefficients $w_1$ and $w_2$ can be determined by the following equation.

[Equation 44]

$$w_2 = \frac{W_{g2}f_2}{W_{g1}f_1}w_1 \quad (44)$$

Here $\Delta P'_i$, which is the utilization probability update information in the fifth embodiment, can be determined by substituting the above equation for the following equation.

[Equation 45]

$$\Delta P'_i = \frac{1}{n-1}\left[A\left(\alpha_i\sum_{x_{1,j}>x_{1,i}}(w_1 x_{1,j} - w_1 x_{1,i}) - \beta_i \sum_{x_{1,i}>x_{1,j}}(w_1 x_{1,i} - w_1 x_{1,j})\right) + B\left(\alpha_i \sum_{x_{2,j}>x_{1,i}}(w_2 x_{2,j} - w_1 x_{1,i}) - \beta_i \sum_{x_{1,i}>x_{2,j}}(w_1 x_{1,i} - w_2 x_{2,j})\right)\right] \quad (45)$$

According to the fifth embodiment, the weight coefficients, in which priority of the group is reflected, is considered when the channel utilization probability is updated. Since the channel utilization probability is updated so that the priority of the group is reflected, the utilization probability of communication channels can be further increased.

(Sixth Embodiment)

A difference of the sixth embodiment from the first embodiment is that a measurement index is generated utilizing the channel utilization time and the bandwidth in use of each lower-level station. Description on other configurations of the sixth embodiment, which is the same as the first embodiment, is omitted.

Combinations of the communication time required for communication and the bandwidth to be utilized have an infinite variety, depending on the characteristics of the applications utilized by each lower-level station. For example, one lower-level station may want to continue transmission for a long time utilizing a relatively narrow bandwidth, such as a case of voice calls, and another lower-level station may want to transmit signals in a relatively short time utilizing a wide bandwidth, such as a case of a large capacity data transfer. In order to ensure impartiality among lower-level stations and among groups under such an environment, the measurement index could be set as a product of the channel utilization time of each lower-level station multiplied by bandwidth in use of each lower-level station, for example. Thereby the utilization efficiency of communication channels can be further improved.

(Seventh Embodiment)

A difference of the seventh embodiment from the first embodiment is that the measurement index is generated utilizing the channel utilization time, bandwidth in use and signal reaching range of each lower-level station.

When each group utilizes a different communication system, transmission power may differ between lower-level stations belonging to different groups, because of the influence of the radio system and station disposition design. In such a case, if a lower-level station having a relatively high output power transmits signals, other lower-level stations may not be able to utilize communication channels throughout a relatively wide range.

In order to ensure impartiality among lower-level stations and among groups in such an environment, the measurement index is set to a product of the channel utilization time of each lower-level station multiplied by bandwidth in use of each lower-level station and a signal reach area calculated based on the signal reaching range, for example. Thereby the utilization efficiency of communication channels can be further improved.

The present invention was described in detail based on the embodiments above. The present invention, however, is not limited to these embodiments. The present invention can be modified in various ways in a scope that does not deviate from the spirit thereof.

The invention claimed is:

1. A radio communication system comprising:
an upper-level station;
a plurality of lower-level stations, each of the lower-level stations having a lower-level station ID that identifies the lower-level station and a group ID that identifies a group to which the lower-level station belongs; and
a signal including the lower-level station ID and the group ID that is transmitted/received between the lower-level stations, wherein
each lower-level station from the plurality of lower-level stations includes:

a detection unit that detects, from the signal from another lower-level station, the lower-level station ID and the group ID of the other lower-level station, a measurement unit that measures a channel utilization state of the other lower-level station based on the signal, a calculation unit that calculates a channel utilization amount for each lower-level station and a channel utilization amount for each group, based on the lower-level station ID and group ID of the other lower-level station detected by the detection unit and the channel utilization state of the other lower-level station measured by the measurement unit, an update unit that updates a channel utilization probability which indicates a utilization probability of communication channels based on the channel utilization amount for each lower-level station and the channel utilization amount for each group calculated by the calculation unit, and a determination unit that determines a communication channel to be utilized for transmission by the lower-level station, based on the channel utilization probability updated by the update unit, and the calculation unit further calculates the channel utilization amount for each lower-level station and the channel utilization amount for each group based on a reaction coefficient which indicates a partiality in an allocation of communication channels within the group as well as the lower-level station ID, the group ID, and the channel utilization state.

2. The radio communication system according to claim 1, wherein the calculation unit calculates the channel utilization amount for each lower-level station and the channel utilization amount for each group based on a weight coefficient that includes a priority of the group, the lower-level station ID, the group ID, and the channel utilization state.

3. The radio communication system according to claim 1, wherein the measurement unit measures the channel utilization state of the other lower-level station based on a communication channel utilization time for each lower-level station.

4. The radio communication system according to claim 3, wherein the measurement unit measures the channel utilization state of the other lower-level station based on a bandwidth utilized by each lower-level station and the communication channel utilization time for each lower-level station.

5. The radio communication system according to claim 4, wherein the measurement unit measures the channel utilization state of the other lower-level station based on a reaching range of a signal which each lower-level station transmits, the communication channel utilization time for each lower-level station, and the bandwidth utilized by each lower-level station.

6. A radio communication system comprising:
an upper-level station;
a plurality of lower-level stations, each of the lower-level station having a lower-level station ID that identifies the lower-level station and a group ID that identifies a group to which the lower-level station belongs; and
a signal including the lower-level station ID and the group ID that is transmitted/received between the lower-level stations, wherein
each lower-level station from the plurality of lower-level stations includes:
a request transmission unit that transmits, to the upper-level station, a channel request to have the upper-level station determine a communication channel to be utilized for transmission by the lower-level station, and a channel information receiving unit that receives a channel information which indicates a communication channel determined by the upper-level station in response to the channel request transmitted by the request transmission unit, and the upper-level station includes:

a detection unit that detects the lower-level station ID and the group ID from the signal from the lower-level station connected to the upper-level station, a measurement unit that measures a channel utilization state of the lower-level station connected with the upper-level station, based on the signal, a calculation unit that calculates a channel utilization amount for each lower-level station and a channel utilization amount for each group, based on the lower-level station ID and the group ID detected by the detection unit and the channel utilization state measured by the measurement unit, an update unit that updates a channel utilization probability which indicates a utilization probability of communication channels based on the channel utilization amount for each lower-level station and the channel utilization amount for each group calculated by the calculation unit, a determination unit that determines a communication channel to be utilized for transmission by the lower-level station which has transmitted the channel request, based on the channel utilization probability updated by the update unit, and a channel information transmission unit that transmits the channel information which indicates the communication channel determined by the determination unit, to the lower-level station which has transmitted the channel request, and the calculation unit further calculates the channel utilization amount for each lower-level station and the channel utilization amount for each group based on a reaction coefficient which indicates a partiality in an allocation of communication channels within the group as well as the lower-level station ID, the group ID, and the channel utilization state.

7. A lower-level station having a lower-level station ID that identifies the lower-level station and a group ID that identifies a group to which the lower-level station belongs that transmits/receives a signal including the lower-level station ID and the group ID between the lower-level station and another lower-level station, the lower-level station comprising:

a detection unit that detects, from the signal from the other lower-level station, a lower-level station ID and a group ID of the other lower-level station;

a measurement unit that measures a channel utilization state of the other lower-level station based on the signal;

a calculation unit that calculates a channel utilization amount for each lower-level station and a channel utilization amount for each group, based on the lower-level station ID and group ID of the other lower-level station detected by the detection unit and the channel utilization state of the other lower-level station measured by the measurement unit;

an update unit that updates a channel utilization probability which indicates a utilization probability of communication channels based on the channel utilization amount for each lower-level station and the channel utilization amount for each group calculated by the calculation unit; and a determination unit that determines a communication channel to be utilized for transmission by the lower-level station, based on the channel utilization probability updated by the update unit, wherein the calculation unit further calculates the channel utilization amount for each lower-level station and the channel utilization amount for each group based on a reaction coefficient which indicates a partiality in an allocation of communication channels within the group as well as the lower-level station ID, the group ID, and the channel utilization state.

8. An upper-level station that receives, from a lower-level station, a channel request to determine a communication channel to be utilized for transmission by the lower-level station that transmits a signal including a lower-level station ID that identifies the lower-level station and a group ID that identifies a group to which the lower-level station belongs, and then transmits a channel information which indicates the communication channel to the lower-level station, the upper-level station comprising:

a detection unit that detects the lower-level station ID and the group ID from the signal from the lower-level station connected to the upper-level station;

a measurement unit that measures a channel utilization state of the lower-level station connected to the upper-level station based on the signal;

a calculation unit that calculates a channel utilization amount for each lower-level station and a channel utilization amount for each group, based on the lower-level station ID and group ID detected by the detection unit and the channel utilization state measured by the measurement unit;

an update unit that updates a channel utilization probability which indicates a utilization probability of communication channels based on the channel utilization amount for each lower-level station and the channel utilization amount for each group calculated by the calculation unit;

a determination unit that determines a communication channel to be utilized for transmission by the lower-level station which has transmitted the channel request, based on the channel utilization probability updated by the update unit; and a channel information transmission unit that transmits the channel information which indicates the communication channel determined by the determination unit, to the lower-level station which has transmitted the channel request, wherein the calculation unit further calculates the channel utilization amount for each lower-level station and the channel utilization amount for each group based on a reaction coefficient which indicates a partiality in an allocation of communication channels within the group as well as the lower-level station ID, the group ID, and the channel utilization state.

* * * * *